US006768456B1

(12) United States Patent
Lalezari et al.

(10) Patent No.: US 6,768,456 B1
(45) Date of Patent: Jul. 27, 2004

(54) ELECTRONICALLY AGILE DUAL BEAM ANTENNA SYSTEM

(75) Inventors: Farzin Lalezari, Louisville, CO (US); Theresa Cronin Boone, Boulder, CO (US)

(73) Assignee: Ball Aerospace & Technologies Corp., Broomfield, CO (US)

( * ) Notice: Subject to any disclaimer, the term of this patent is extended or adjusted under 35 U.S.C. 154(b) by 1825 days.

(21) Appl. No.: 07/944,199

(22) Filed: Sep. 11, 1992

(51) Int. Cl.[7] .................................................. H01Q 3/26
(52) U.S. Cl. ....................................... 342/373; 342/374
(58) Field of Search ................................. 342/368, 373, 342/374, 377

(56) References Cited

U.S. PATENT DOCUMENTS

| | | | |
|---|---|---|---|
| 3,202,992 A | 8/1965 | Kent et al. ................... | 343/100 |
| 3,523,659 A | 8/1970 | Epperson, Jr. ............... | 244/3.17 |
| 3,530,485 A | 9/1970 | Radford ....................... | 343/854 |
| 3,531,803 A | 9/1970 | Rosen et al. ................. | 343/100 |
| 3,585,206 A * | 6/1971 | Scheidler et al. ............ | 342/157 |
| 3,699,574 A | 10/1972 | O'Hara et al. .............. | 343/16 M |
| 3,740,002 A | 6/1973 | Schaefer ...................... | 244/3.19 |
| 3,816,830 A | 6/1974 | Giannini ................ | 343/100 SA |
| 3,821,740 A | 6/1974 | Ehrlich ................. | 343/100 SA |
| 3,860,929 A | 1/1975 | Crain ........................ | 343/113 R |
| 3,868,695 A | 2/1975 | Kadak ......................... | 343/778 |
| 3,897,918 A | 8/1975 | Gulick, Jr. et al. ......... | 244/3.19 |
| 3,922,685 A | 11/1975 | Opas ........................... | 343/854 |
| 3,940,770 A | 2/1976 | Fassett et al. ................ | 343/754 |
| 3,964,066 A | 6/1976 | Nemit .................. | 343/100 SA |
| 4,001,763 A | 1/1977 | Kits van Heyningen .. | 340/3 PS |
| 4,010,474 A | 3/1977 | Provencher .................. | 343/814 |
| 4,123,759 A | 10/1978 | Hines et al. ................. | 343/863 |
| 4,176,322 A | 11/1979 | Kommrusch ................ | 325/369 |
| 4,204,210 A | 5/1980 | Hose ........................... | 343/6 R |
| 4,204,655 A | 5/1980 | Gulick et al. ............... | 244/3.19 |

(List continued on next page.)

OTHER PUBLICATIONS

Mailloux, "Conformal and Low–Profile Arrays", Chapter 21 in *Antenna Engineering Handbook*, McGraw–Hill, Johnson et al., eds., 2nd ed., 1984.

Schuchardt et al., "Seeker Antennas", Chapter 38 in *Antenna Engineering Handbook*, McGraw–Hill, Johnson et al., eds., 2nd ed., 1984.

Kennedy et al., "Direction–Finding Antennas and Systems", Chapter 39 in *Antenna Engineering Handbook*, McGraw–Hill, Johnson et al., eds., 2nd ed., 1984.

Primary Examiner—Gregory C. Issing
(74) Attorney, Agent, or Firm—Sheridan Ross P.C.

(57) ABSTRACT

The present invention provides an improved antenna system that, in one embodiment, includes an antenna array comprised of a plurality of elements, each of which is capable of providing a signal. Also included in the improved antenna system is a multi-beam beamformer for producing two spatially independent overlapping beams from the signals provided by two different subsets of the antenna array. The phase of the two beams is compared to realize an interferometer that can provide high or fine resolution data on the position of an object relative to the antenna system. The amplitude of the two beams can also be compared to obtain coarse data on the position of the object. The beamformer includes a switching network for selecting which elements of the antenna array form the two subsets. This permits, for example, the position of the beams to moved, the baseline of the two beams to be varied, and/or the beam width of the beams to be altered. To reduce adverse aerodynamic effects in certain applications, the antenna array is located conformal to the exterior surface of the body on which the array is mounted. Further, to reduce temperature related problems associated with high speed movement of the body on which the array is located, the array is located on the side of the body, as opposed to the front of the body. The side location also provides space for other types of sensors that are preferably located adjacent to the front surface of the body.

62 Claims, 14 Drawing Sheets

U.S. PATENT DOCUMENTS

| | | | |
|---|---|---|---|
| 4,257,050 A | 3/1981 | Ploussios | 343/854 |
| 4,264,907 A | 4/1981 | Durand, Jr. et al. | 343/6 ND |
| 4,277,787 A | 7/1981 | King | 343/100 SA |
| 4,451,831 A | 5/1984 | Stangel et al. | 343/374 |
| 4,509,052 A | 4/1985 | Cash | 343/418 |
| 4,540,139 A | 9/1985 | Levy et al. | 244/3.19 |
| 4,544,927 A | 10/1985 | Kurth et al. | 343/373 |
| 4,638,320 A | 1/1987 | Eggert et al. | 342/442 |
| 4,924,235 A | 5/1990 | Fujisaka et al. | 342/374 |
| 5,093,668 A | 3/1992 | Sreenivas | 342/374 |
| 5,220,330 A | 6/1993 | Salvail et al. | 342/62 |

\* cited by examiner

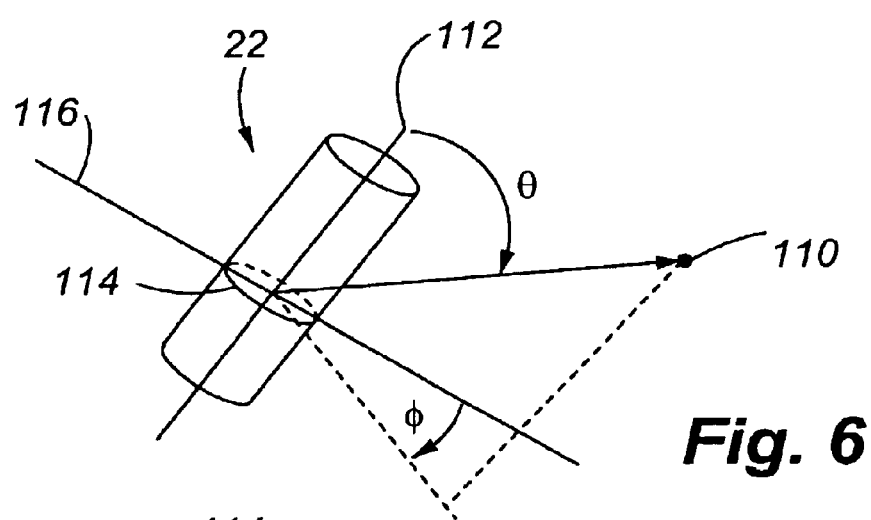
Fig. 6
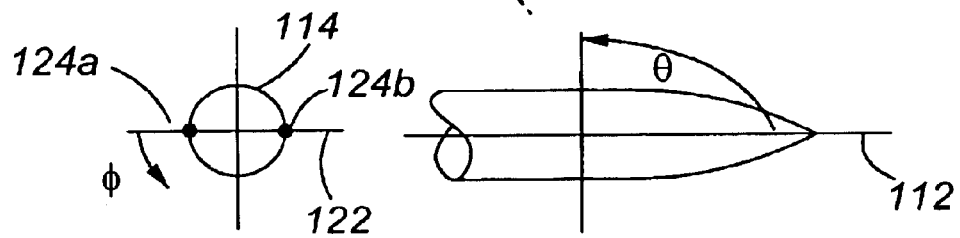
Fig. 7B  Fig. 7A

| State | Left | Right | Coverage (deg)* (See Subtitle) | DF | Data |
|---|---|---|---|---|---|
| 1 | 1 | 2 | 11.25 TO 33.75 | Coarse/Amplitude | |
| 2 | 1 | 1 | 0 TO 22.5 | Fine/Phase | √ |
| 3 | 2 | 3 | 33.75 to 56.25 | Coarse/Amplitude | |
| 4 | 2 | 2 | 22.5 TO 45 | Fine/Phase | √ |
| 5 | 3 | 4 | 56.25 TO 78.75 | Coarse/Amplitude | |
| 6 | 3 | 3 | 45 TO 67.5 | Fine/Phase | √ |
| 7 | 4 | 5 | 78.75 TO 101.25 | Coarse/Amplitude | |
| 8 | 4 | 4 | 67.5 TO 90 | Fine/Phase | √ |
| 9 | 5 | 6 | 101.25 TO 123.75 | Coarse/Amplitude | |
| 10 | 5 | 5 | 90 TO 112.5 | Fine/Phase | √ |
| 11 | 6 | 7 | 123.75 TO 146.25 | Coarse/Amplitude | |
| 12 | 6 | 6 | 112.5 to135 | Fine/Phase | √ |
| 13 | 7 | 8 | 146.25 TO 168.75 | Coarse/Amplitude | |
| 14 | 7 | 7 | 135 TO 157.5 | Fine/Phase | √ |
| 15 | 8 | 9 | 168.75 TO 191.25 | Coarse/Amplitude | |
| 16 | 8 | 8 | 157.5 TO 180 | Fine/Phase | √ |
| 17 | 9 | 10 | 191.25 TO 213.75 | Coarse/Amplitude | |
| 18 | 9 | 9 | 180 TO 202.5 | Fine/Phase | √ |
| 19 | 10 | 11 | 213.75 TO 236.25 | Coarse/Amplitude | |
| 20 | 10 | 10 | 202.5 TO 225 | Fine/Phase | √ |
| 21 | 11 | 12 | 236.25 TO 258.75 | Coarse/Amplitude | |
| 22 | 11 | 11 | 225 TO 247.5 | Fine/Phase | √ |
| 23 | 12 | 13 | 258.75 TO 281.25 | Coarse/aAmplitude | |
| 24 | 12 | 12 | 247.5 TO 270 | Fine/Phase | √ |
| 25 | 13 | 14 | 281.25 TO 303.75 | Coarse/Amplitude | |
| 26 | 13 | 13 | 270 TO 292.5 | Fine/Phase | √ |
| 27 | 14 | 15 | 303.75 TO 326.25 | Coarse/Amplitude | |
| 28 | 14 | 15 | 292.5 TO 314 | Fine/Phase | √ |
| 29 | 15 | 16 | 326.25 TO 348.75 | Coarse/Amplitude | |
| 30 | 15 | 15 | 315 TO 337.5 | Fine/Phase | √ |
| 31 | 16 | 1 | 348.75 TO 11.25 | Coarse/Amplitude | |
| 32 | 16 | 16 | 337.5 TO 360/0 | Fine/Phase | √ |

*Fig. 14*

ELECTRONICALLY AGILE DUAL BEAM ANTENNA SYSTEM

BACKGROUND OF THE INVENTION

1. Field of the Invention

The present invention relates to antenna systems and, in particular, to an antenna system that uses a multi-element antenna array to receive an electromagnetic signal and generate a plurality of electrical signals that are representative of the received electromagnetic signal and a multi-beam beamformer to produce at least two spatially independent, overlapping beams from the electrical signals provided by the array.

2. Description of the Related Art

Presently, antenna systems are used in many aeronautical applications. One application for an antenna system is as part of a radar on an aircraft where the antenna system is used to obtain positional information on the objects in the space surrounding the aircraft. This positional information is then typically used to either avoid an object, such as another aircraft, or to home in on an object, such as a navigational beacon.

Present radar antenna system technology is becoming increasingly hard-pressed to provide sufficient information on the space around an aircraft as the speed of the aircraft on which the radar antenna system is mounted and of the other aircraft in the surrounding airspace increases. Specifically, present radar antenna systems are generally proving inadequate with respect to their detection range, field of view, resolution, or combinations thereof in situations that involve high-speed aircraft. For example, if the radar antenna system in one of two high-speed aircraft that are approaching one another has a short range, the radar antenna system may not be able to provide information on the other aircraft in time to avoid a collision. If, on the other hand, the radar antenna system in an aircraft has a limited area of coverage, and the aircraft is attempting to join up with a high-speed aircraft, the high-speed aircraft may not be detected with such a radar antenna system. Further, if the antenna system in an aircraft has a limited resolution, the ability of the aircraft to make the appropriate course corrections may be compromised.

Further, high-speed aircraft also exhibit high skin temperatures that are on the order of 3000° F. and higher. These temperatures present severe radiation problems to any radar antenna system mounted on the aircraft. Conventional approaches to this problem ordinarily involve the design of a radome, which protects the radar antenna system and forms part of the skin of the aircraft, that employs exotic materials and/or active cooling systems that are generally complex and expensive.

Further, to realize higher velocities and/or improved maneuvering characteristics, the aerodynamics of aircraft are being constantly improved. However, the ability to realize the improved performance is becoming increasing sensitive to anything that may affect the aerodynamics of the aircraft. Consequently, the design of a radar antenna system that is to be deployed on aircraft must consider the effects of the radar antenna system on the aerodynamics of the aircraft.

The ability of aircraft-based radar antenna systems to provide adequate information on objects in the surrounding space is also becoming increasingly difficult due to the reductions in the radar cross-sections of many of these objects. For example, as aircraft become more aerodynamic, their radar cross-section typically decreases, thereby making it more difficult for a radar antenna system to detect the aircraft. As a result, other types of sensors or detectors that operate on different principles, such as electro-optic sensors, are being used in conjunction with, or to supplement the radar. At least with respect to aircraft-based radar, the space to accommodate additional sensors, and especially those sensors that are to be used in high-speed aircraft environments, is limited. Consequently, the impact of a radar antenna system must be considered in such situations.

Another application in which the performance of present antenna systems is becoming increasingly less reliable is when there is a need for a very focused or narrow beam (transmitted or received) with low side lobes and/or high gain. A narrow beam with low side lobes is, for example, desirable in situations in which the goal is to reduce the possibility of the signals produced by either the antenna system or an object in the antenna system's scanning area from being intercepted. High gain is also desirable in such a situation because it allows the antenna system to detect objects that produce low-power signals, or, stated another way, to operate in environments where there is a low signal-to-noise ratio (SNR). Present antenna systems that use partially overlapping beams in such situations have become increasingly less reliable as the need to operate in lower SNR environments increases.

Yet a further concern with respect to antenna systems is that as the performance requirements of the various applications has increased, the antenna systems that are designed to meet these requirements have tended to become more complex. This is of concern because increasing complexity generally results in a reduced reliability that is unacceptable in many applications.

SUMMARY OF THE INVENTION

Based on the foregoing, an object of the present invention is to provide an antenna system that addresses the high range, resolution, and field of view requirements of high-speed aircraft environments.

A further object of the present invention is to provide an antenna system that can be used in high-speed, high-temperature environments which substantially reduces the need for a radome formed of exotic material and/or the use of a complex cooling system.

Yet another object of the present invention is to provide an antenna system that is sensitive to the aerodynamics of the aircraft on which it is mounted.

Another object of the present invention is to provide an antenna system that addresses the concern for space on an aircraft and especially the space associated with the frontal surface or nose portion of an aircraft.

A further object of the present invention is to provide an antenna system that addresses applications in which the interception of an antenna system signal is undesirable.

Yet a further object of the present invention is to provide an antenna system that is relatively simple and reliable.

One embodiment of the antenna system of the present invention that is suitable for aircraft or ground-based applications includes an antenna array for receiving an electromagnetic signal and providing a plurality of signals that are representative of the electromagnetic signal. The antenna array is comprised of a plurality of antenna elements, each of which is capable of providing one signal of the plurality of signals. The antenna system further includes a beamformer for processing a first subset and a second subset of the plurality of signals provided by the antenna array to produce two "beams". The beams are electrical signals that are representative of the electromagnetic signal received from a particular area. To be able to change the characteristics of the beams, the beamformer includes a switching network that permits selection of which antenna elements will provide the signals comprising the first and second subsets. For example, by changing the number of antenna elements whose signals comprise the beams, the beamwidths of the beams can be changed. Similarly, by changing the identity of the antenna elements whose signals make up the first and second subsets, the baseline between the two beams can be altered. This can be useful in resolving positional ambiguities. The antenna system further includes a device for cooperatively using the first and second beams produced by the beamformer to determine information on the surrounding environment, such as the location of an object. Specifically, the device can perform an amplitude comparison of the two beams to attain coarse positional information and a phase comparison of the two beams to realize an interferometer that provides fine or high resolution positional information.

In another embodiment of the antenna system that includes an antenna array, the beamformer operates such that the two beams formed by it are spatially independent or, stated another way, formed from the signals provided by two different subsets of antenna elements. Additionally, the formed beams are representative of the electromagnetic signals received by the two different subsets from overlapping areas.

Yet another embodiment of the antenna system of the present invention that is particularly adapted for applications in which the antenna system is to be mounted on a moving craft, such as an aircraft, and especially a high speed moving craft, includes an antenna array for providing a plurality of signals that has a low profile with respect to the surface of the craft to reduce any adverse impacts upon the aerodynamics of the craft. Alternatively, or in addition, the antenna array can be mounted on the side of the craft. By mounting the antenna array on the side of the craft, space for other sensors that are preferably located in the front or nose portion of the craft is increased. Furthermore, the side location also substantially reduces temperature related problems and the need for exotic materials or complex cooling systems, especially if the antenna array is also conformal with the side surface. This embodiment of the antenna system further comprises a multi-beam beamformer for producing two beams from the signals produced by the antenna array and a device for cooperatively using the two beams to provide information on the surrounding space.

The present invention also provides a method for operating an antenna system that includes the step of providing an antenna array with a plurality of elements, each element being capable of providing one of the plurality of signals. The method further includes the steps of using the signals provided by a subset of the plurality of elements to produce a first beam and using the signals provided by another subset of the plurality of elements to produce a second beam. Also included in the method is the step of cooperatively using the first and second beams to determine information on the space surrounding the antenna array. This step can involve a phase comparison of the two beams to implement an interferometer that provides fine or high resolution data on the surrounding space. This step can also include an amplitude comparison of two beams to generate coarse data on the surrounding environment. The method further includes electronically changing or switching the elements of the first and second subsets that are used to form the first and second beams. This can include changing the identity of the elements to, for example, vary the baseline between the two beams and/or changing the number of elements to alter the beamwidths of the two beams.

BRIEF DESCRIPTION OF THE DRAWINGS

FIG. 6 illustrates the geometrical or positional relationship between the aircraft shown in FIG. 1 and an object in the space surrounding the aircraft;

FIGS. 7A and 7B illustrate the geometrical relationships used to specify the position of an object relative to the aircraft and antenna system of FIG. 1 when the forward looking receive array is being used to obtain high resolution data;

FIG. 14 is the truth table for the two independent switching networks illustrated in FIG. 13;

DETAILED DESCRIPTION OF THE EMBODIMENTS OF THE INVENTION

Figure 1:
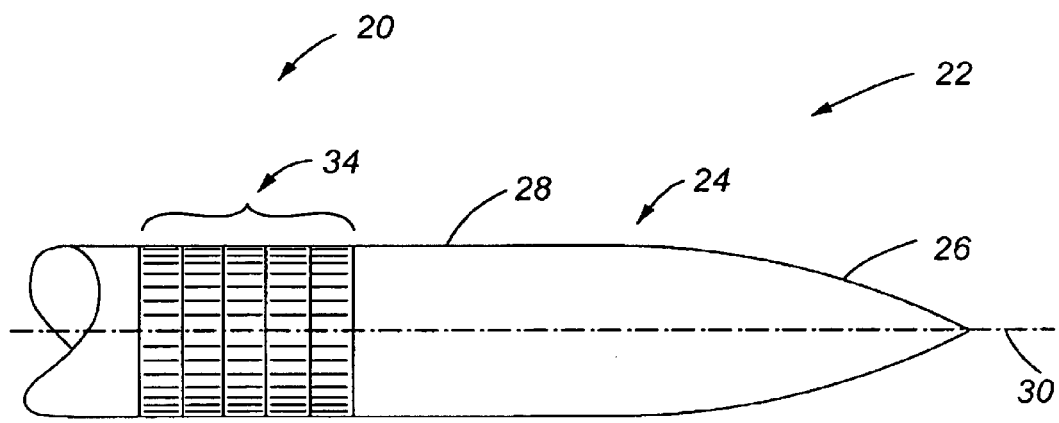
FIG. 1 illustrates a first embodiment of the antenna system of the present invention in which the antenna system forms part of a radar and includes an array that is mounted conformal with the side of an aircraft.

FIG. 1 illustrates a first embodiment of the antenna system of the present invention 20, hereinafter referred to as antenna system 20. The antenna system 20 is part of a radar that is located on an aircraft 22 which has an exterior surface 24 comprised of a front or nose surface 26, a cylindrical side surface 28, and a longitudinal axis 30 that also defines the direction of movement of the aircraft 22. To distinguish the nose surface 26 from the side surface 28, any point on the nose surface 26 has a surface area vector that is other than perpendicular to the longitudinal axis 30 and any point on the side surface has an area vector that is substantially perpendicular to the longitudinal axis 30.

The antenna system 20 includes an antenna array 34 that is mounted on the side surface 28 of the aircraft 22 such that it has a low profile with respect to the side surface 28. In this case, the antenna array is substantially conformal with the side surface 28. The low-profile or conformal mounting of the antenna array 34 on the side surface 28 has several benefits. Namely, by mounting the antenna array 34 so that it is conformal with, or has a low profile relative to, the exterior surface 24 of the aircraft 22, any adverse effects of the antenna array 34 upon the aerodynamic behavior of the aircraft 22 are substantially reduced. Further, the mounting of the antenna array 34 on the side surface 28 permits the space interior to the antenna array and/or the interior or exterior space between the antenna array 34 and the nose surface 26 to be used to accommodate or house other types of sensors that can be used as alternatives to, or to supplement the antenna system 20. For instance, electro-optic and/or infrared sensors can be located in this space. Mounting the antenna array 34 or a portion thereof on the nose surface 26 is also feasible should the application require or permit such a mounting. Further, the conformal or low profile mounting of the antenna array 34 on the side surface 28 substantially protects the antenna array from the high temperatures existing at the nose surface 26 when the aircraft 22 moves at high velocities. Consequently, the need for a protective radome made of exotic materials and an elaborate cooling system are substantially reduced, if not eliminated.

Figure 2:
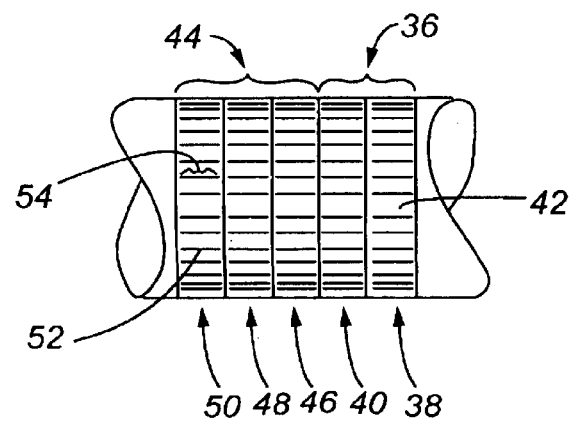
FIG. 2 identifies the forward and side looking transmit and receive arrays of the antenna array shown in FIG. 1.
Figure 3:
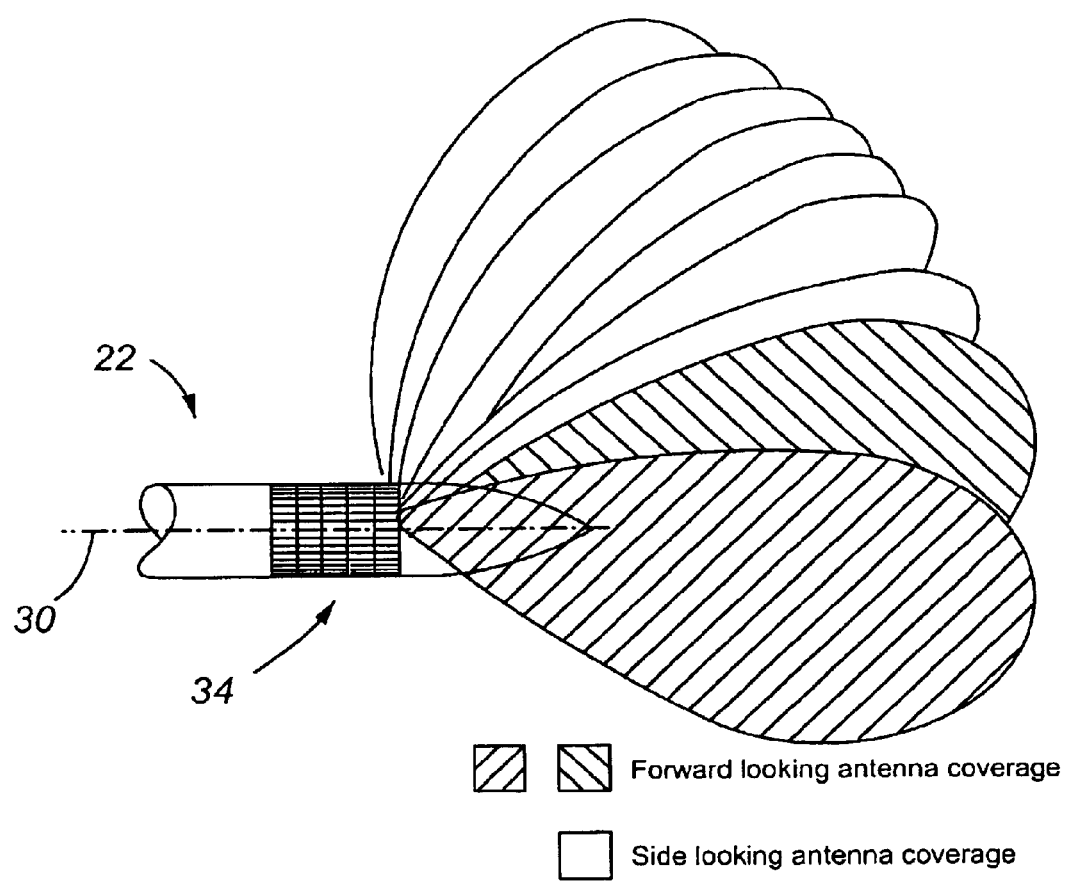
FIG. 3 illustrates the forward and side looking fields of view for the forward and side looking arrays identified in FIG. 2.

With reference to FIGS. 2 and 3, the antenna array 34 includes a forward looking array 36 for transmitting and receiving signals within a field of view that extends ±20° from the longitudinal axis 30. The forward looking array 36 includes a forward looking transmit array 38 for transmitting signals within the defined field of view and a forward looking receive array 40 for receiving signals within the defined field of view. The forward looking transmit array 38 and the forward looking receive array 40 each exist in a plane that is substantially perpendicular to the longitudinal axis 30. Further, each of the forward looking transmit array 38 and forward looking receive array 40 are comprised of thirty-two forward looking elements 42 that are equally spaced about the side surface 28 so that there are sixteen pairs of forward looking elements 42 that are located diametrically opposite to one another relative to the longitudinal axis 30.

With continuing reference to FIGS. 2 and 3, the antenna array 34 further includes a side looking array 44 for transmitting and receiving signals in a field of view that extends from ±20° with respect to the longitudinal axis to ±60° with respect to the longitudinal axis. The side looking array 44 includes a side looking transmit array 46 for transmitting signals within the defined field of view and a first side looking receive array 48 and a second side looking receive array 50 for receiving signals within the defined field of view. The side looking transmit array 46, first side looking receive array 48, and second side looking receive array 50 each exist in a plane that is substantially perpendicular to the longitudinal axis 30. Further, each is comprised of thirty-two side looking elements 52 that are equally spaced about the circumference of the side surface 28 so that there are sixteen pairs of side looking elements 52 that are located diametrically opposite to one another relative to the longitudinal axis 30. In addition, the side looking elements 52 associated with the first side looking receive array 48 and the second side looking receive array 50 are aligned with one another to form thirty-two column arrays 54.

Several variations of the antenna array 34 are possible. For instance, if the antenna array 34 is used in a semi-active radar system in which the transmitted signal is provided from another source or a passive radar system, the forward looking transmit array 38 and side looking transmit array 46 can be eliminated from the antenna array 34. Further, if the forward looking array 36 provides sufficient coverage for an application, the side looking array 44 can be excluded from the antenna array 34. Furthermore, the designs of the forward looking array 36 and the side looking array 44 can be modified to change their respective fields of view. The orientation of the planes in which the various antenna arrays lie can also be altered to suit the application. Additionally, the spacing, grouping and/or number of antenna elements comprising the forward looking array 36 and/or the side looking array 44 can be changed to suit the requirements of an application. Further, an alternative to the antenna array 34 is to replace all or subsets of the elements with single elements that have multiple feed points.

Figure 4:
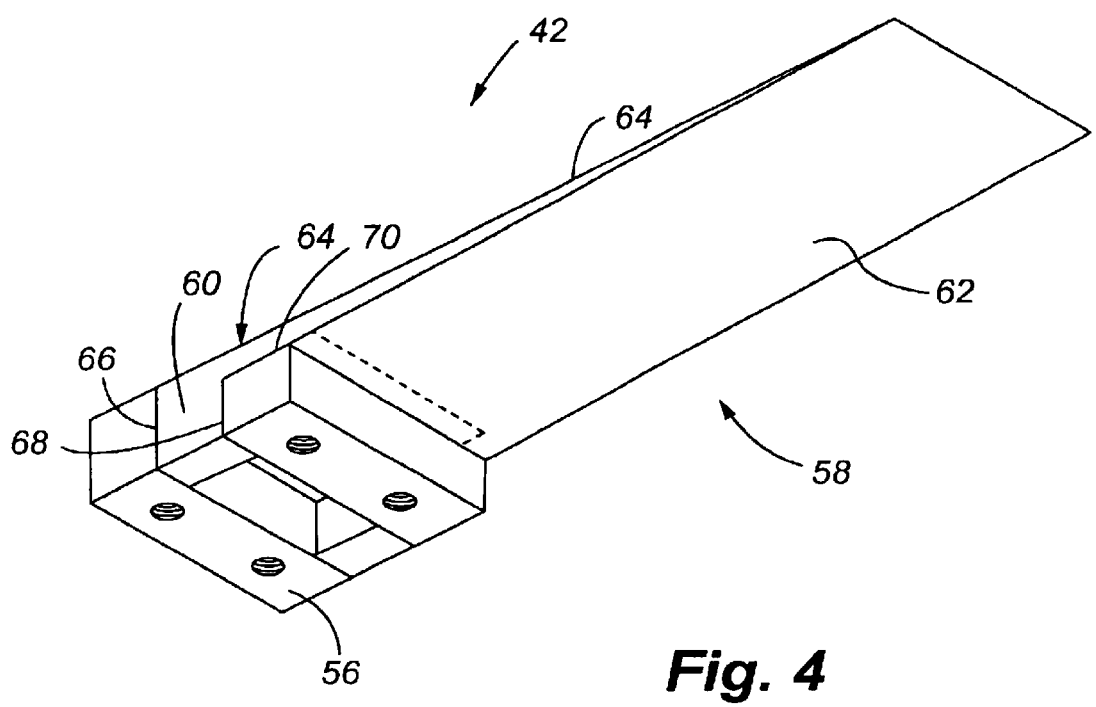
FIG. 4 illustrates one of the antenna elements that comprises the forward looking array shown in FIG. 2.

FIG. 4 illustrates one of the forward looking elements 42 that comprises the forward looking array 36. The forward looking element 42, when used to transmit a signal, produces a surface wave that, upon propagation into the environment surrounding the aircraft 22, has an endfire pattern which makes possible the forward field of view with a conformal side mounting of the element 42. Conversely, when the forward looking element is used to receive signals, it is responsive to signals within the endfire pattern. The forward looking element 42 includes a high power waveguide feed 56 and a resonating structure 58 comprised of a dielectric 60, metallized lower surface 62, exterior surface 64, which is conformal with the side surface 28 of the aircraft 22, first metallized surface 64, second metallized surface 66, third metallized surface 68, and fourth metallized surface 70. If the forward looking array 36 is mounted on the nose surface 26, a forward looking element 42 with a fan or other appropriate pattern, rather than an endfire pattern, can be used.

Figure 5A:
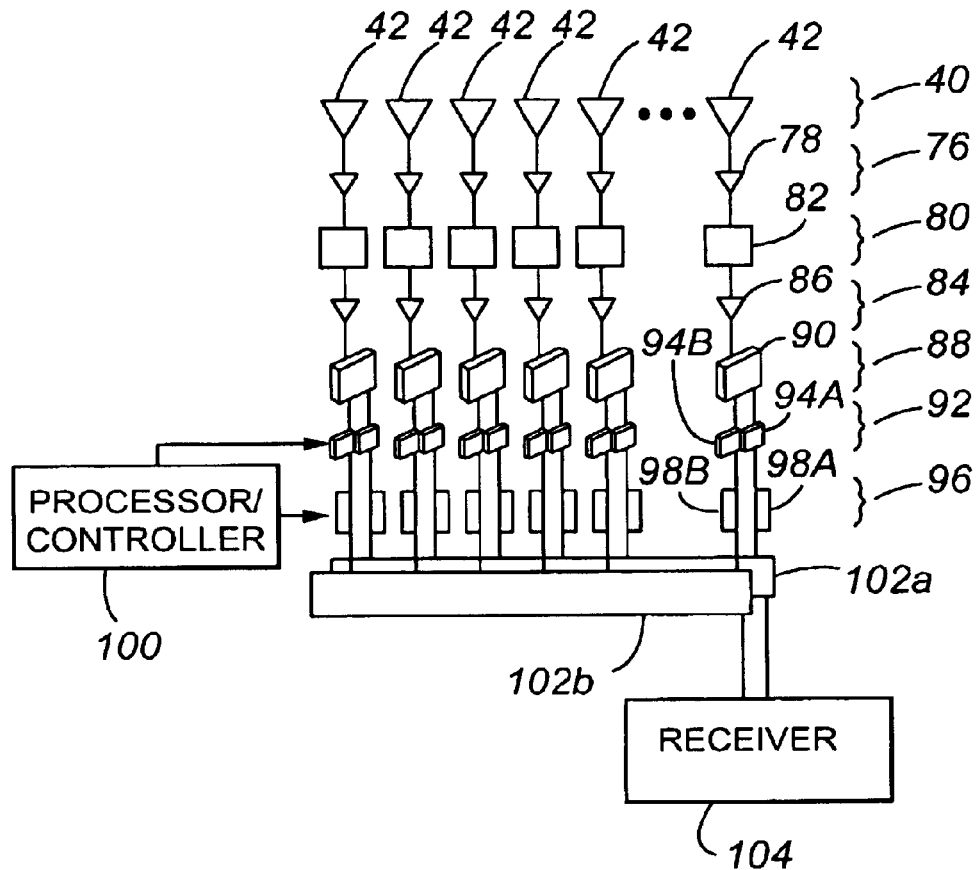
FIG. 5A illustrates the multi-beam beamformer used to process the signals produced by the receive arrays illustrated in FIG. 2.

With reference to FIG. 5A, the antenna system 20 also includes a multi-beam beamformer 74 that is capable of using the signals provided by one of the receiving arrays to substantially simultaneously generate two spatially independent, overlapping beams that can be cooperatively used to provide information relating to the position of an object with respect to the aircraft 22. Further, the multi-beam beamformer 74 permits the number and identity of the signals provided by the receive array antenna that are used to form the two beams to be selected and changed over time. As a result, the beamwidth of the beams can be changed as well as the baseline between the beams. As a matter of convenience, the multi-beam beamformer 74 is illustrated in FIG. 5A as using the signals provided by the forward looking receive array 40. It should be understood that the multi-beam beamformer 74 can switched to utilize the signals provided by the first side looking receive array 48 and/or the second side looking receive array 50. Alternatively, a separate multi-beam beamformer can be used with the first side looking receive array 48 and/or the second side looking receive array 50.

The multi-beam beamformer 74 includes a first low noise amplifier array 76 for amplifying the signals provided by the forward looking receive array 40 while also establishing a high noise figure and maintaining signal linearity over a wide dynamic range. The first low noise amplifier array 76 is comprised of a plurality of single stage gallium arsenide (GaAs) field-effect transistor (FET) amplifiers 78, one of which is associated with each of the forward looking elements. The multi-beam beamformer 74 further includes a filter array 80 for processing the amplified signals produced by the low noise amplifier array 76, to eliminate signals outside the band of interest. The filter array 80 is comprised of a plurality of band pass filters 82, one of which is associated with each of the forward looking elements 42. Also included in the multi-beam beamformer 74 is a second low noise amplifier array 84 for amplifying the signals output by the filter array 80 so that degradation in the noise figure due to losses in the subsequent processing circuitry is reduced. The second low noise amplifier array 84 is comprised of a plurality of amplifiers 86, one of which is associated with each of the forward looking elements 42.

After the signals produced by the forward looking receive array 40 have been processed by the second low noise amplifier array 84, the multi-beam beamformer 74 splits each signal into two signals that can each be selectively used to form one of two beams that the multi-beam beamformer can be used to produce. To split the signals, the multi-beam beamformer 74 further includes a two-way power divider array 88 comprised of a plurality of two-way power dividers 90 that each split the signal output by one of the amplifiers 86 into two separate signals.

A phase shifter array 92 is included in the multi-beam beamformer 74 for phase shifting or delaying the two signals output by each of the two-way power dividers 90 of the two-way power divider array 88. The ability to phase shift the signals permits the resulting beams to be steered. Specifically, the beams can be centered on the longitudinal axis 30 of the aircraft 22 and commutated thereabout using the phase shifter array 92. Additionally, the beams can be offset from, or at an angle to, the longitudinal axis 22 and commutated about the longitudinal axis 22 using the phase shifter array 92. Stated another way, the phase-shifter array permits the beams to be scanned through the field of view of the relevant antenna array. The phase shifter array 92 is comprised of a first plurality of phase shifters 94a with each operating to phase shift the first of the two signals output by one of the two-way power dividers 90 and a second plurality of phase shifters 94b with each operating to delay or phase shift the second signal output by one of the two-way power dividers 90.

A switch array 96 is included in the multi-beam beamformer 74 for use in selecting whether the signal produced by each of the forward looking elements 42 and processed by the subsequent circuitry is used in the formation of one of two beams produced by the beamformer 74. Specifically, the switch array 96 is used to define which of the first signals output by the two-way power divider array 88 are used to produce a first beam and which of the second signals output by the two-way power divider array 88 are used to generate a second beam. To define which of the first signals output by the two-way power divider array 88 are used to generate the first beam, the switch array 96 utilizes a plurality of first switches 98a. A plurality of second switches 98b is used to define which of the second signals output by the two-way power divider array 88 are used to generate the second beam.

The state of the switches comprising the switch array 96 is controlled by a processor 100. Since the switch array 96 permits selection of which signals are used to generate the beams, the identity of the signals used to generate a beam can be changed, thereby permitting the baseline of the two beams to be modified. For example, the signals produced a first pair of elements could be used to generate the two beams for a first period of time and then the switch array 96 can be used to select the signals from a second, different pair of elements to generate the two beams during a second time period. Provided other variables remain unchanged, this results in the baseline or aperture between the beams being changed. Similarly, the switch array 96 permits the number of signals that are used to form a beam to be changed. For example, a single signal could be used to generate a beam for an initial period of time and then the switch array 96 can be used to increase the number of signals that are used to generate the beam, thereby realizing a higher gain beam in the direction of interest. Consequently, the switch array 96 can be used to vary the beamwidth of a beam. Presently, the processor 100 and the switch array 96 are designed so that up to eight signals can be combined to generate a beam. The processor 100 and switch array 96 can, of course, be modified if more signals are required to form a beam.

A first power combiner is included in the beamformer 74 for summing the first signals output by the two-way power divider array 88 that have been selected by the switch array 96 to produce a first beam in the desired direction. Likewise, a second power combiner 102b is included in the beamformer 74 for summing the second signals output by the two-way power divider array 88 that have been selected by the switch array 96 to form a second beam that is spatially independent but overlapping with the first beam.

The antenna system 20 further includes a dual-channel receiver 104 for cooperatively processing the first and second beams output by the first and second power combiners 102a, 102b to provide information relating to the position of an object relative to the aircraft 22. More specifically, the dual-channel receiver 104 can compare the phases or times of arrival of the first and second beams to realize an interferometer that provides fine or high resolution data relating to the position of an object relative to the aircraft 22. Additionally, the dual-channel receiver 104 can perform an amplitude comparison of the first and second beams to generate coarse data relating to the position of an object with respect to the aircraft 22. The amplitude comparison can be done with beams that are generated at substantially the same time or with beams that are generated at different times. If the comparison is done with simultaneously generated beams, the comparison is referred to as simultaneous lobing. If, on the other hand, the amplitude comparison is done on beams that are formed at different times, it is referred to as sequential lobing.

Figure 5B:
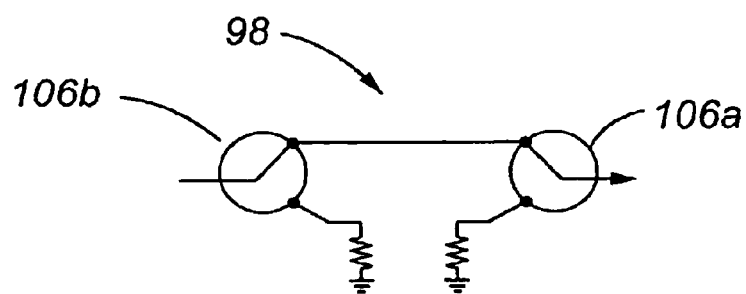
FIG. 5B illustrates one of the switches used in the switching array portion of the multi-beam beamformer illustrated in FIG. 5A.

FIG. 5B illustrates one of the first and second switches 98a, 98b comprising the switch array 96. The switch 98 includes a first single-pole, single-throw switch 106a and a second single-pole, single-throw switch 106b which are controlled by the processor 100 so that the signal produced by a forward looking element 42 is provided to one of the first and second power combiners 102a, 102b or the signal output by one of the forward looking elements 42 is grounded along with the power combiner. This results in the inputs and outputs to the switch being impedance-matched regardless of the state of the switch 98.

Figure 5C:
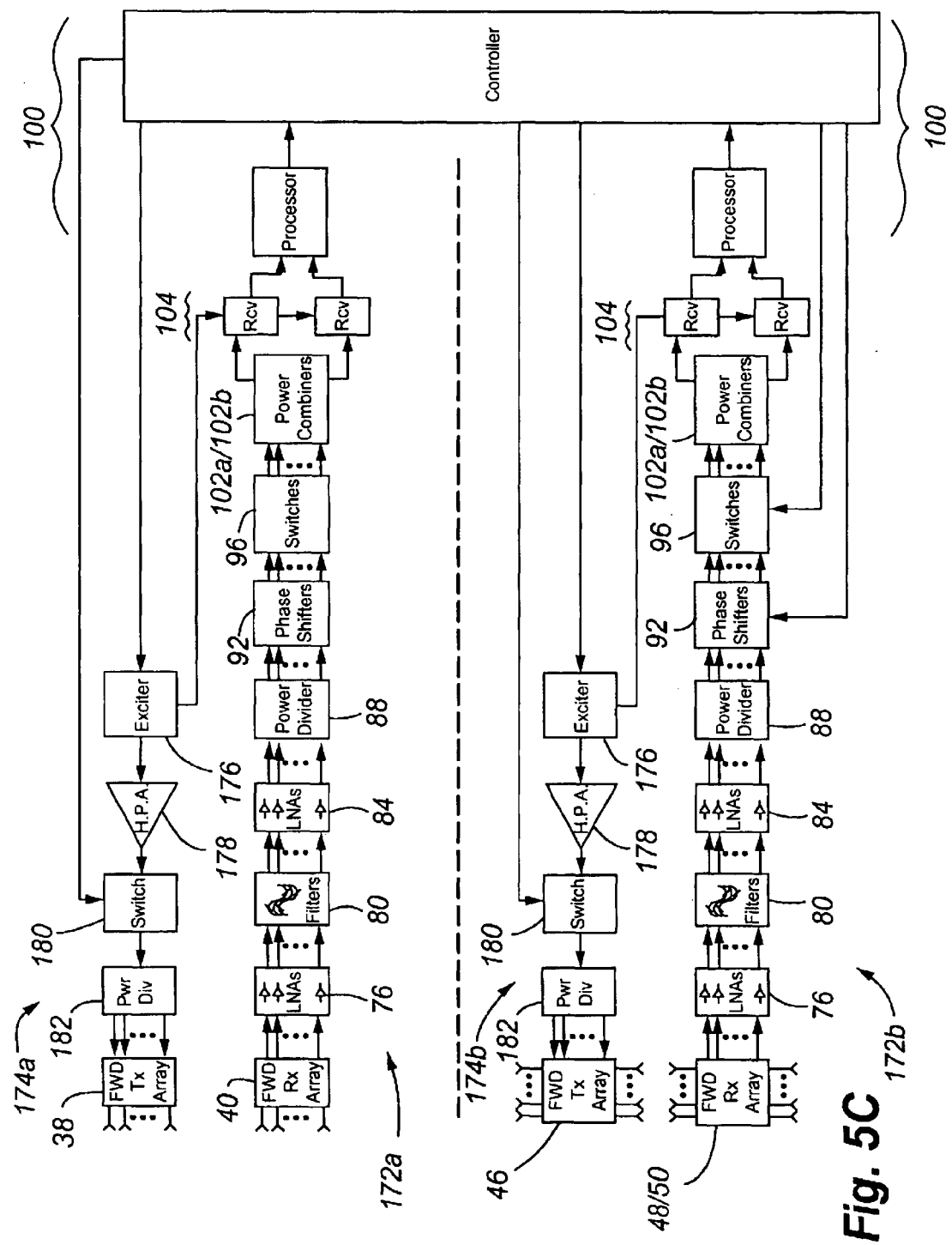
FIG. 5C illustrates the multi-beam beamformers used with the forward and side-looking receive antenna arrays as well as the circuitry used to control the forward and side-looking transmit arrays.

FIG. 5C illustrates a first multi-beam beamformer 172a that is used with the forward looking receive array 40 and a second multi-beam beamformer 172b that is used with the first and second side-looking receive arrays 48, 50. Also shown is forward transmit circuitry 174a that is used to control the signal output by the forward looking transmit array 38 and side looking transmit circuitry 174b that is used to control the signal output by the side looking transmit array 46. Each of the forward transmit circuitry 174a and side looking transmit circuitry 174b include an exciter or oscillator 176 that, when directed by the processor/controller 100, produces a high frequency signal that is amplified by a high power amplifier 178. The high frequency signal produced by the exciter is also applied to the dual-channel receiver 104 of a beamformer for use in down-shifting the frequency spectrum of the two beams that are output by the first and second power combiners 102a, 102b so that the beams can be processed. Each of the forward and side looking transmit circuitries 174a, 174b also include a switch 180 that permits the processor/controller 100 to selectively apply the high frequency signal to a power divider 182. If the processor/controller 100 sets the switch 180 so that the frequency signal is applied to the power divider 182, the power divider 182 splits the signal into a plurality of sub-signals with each sub-signal being applied to one element of the transmit array. Since the high frequency signal is also being applied to the multi-beam beamformer, the antenna system 20 is in an active configuration when the switch 180 is so set. If desired, the power divider 182 can include circuitry for steering the signal output by the transmit array, such as switches for selecting the elements to which the subsignals are applied and phase shifters. If, on the other hand, the switch 180 is not set so that the high frequency signal is applied to the power divider 182, then the high frequency signal is applied only to the dual-channel receiver 104 of the receiving beamformer. With the switch 180 set in this fashion, the antenna system 20 is a semi-active or passive configuration.

Having described the various elements of the antenna system 20, it is now appropriate to describe the operation of the antenna system 20. However, before describing the operation of the antenna system 20, various geometrical relationships between the antenna system 20, the antenna array 34, the aircraft 22, and an object 110 are described with reference to FIG. 6. For purposes of the following description, the longitudinal axis 30 of the aircraft 22 is referred to as the roll axis 112. The roll plane 114 is a plane that is substantially perpendicular to the roll axis 112 and contains any one of the transmitting or receiving arrays. An arbitrarily defined lateral axis 116 lies in the roll plane 114 and intersects the roll axis 112. The location of the object 110 is defined to be upon a line whose loci are determined by the elevation angle $\theta$ of the object with respect to the roll axis 112 and the roll plane angle $\phi$ of the object in the roll plane 114 relative to the lateral axis 116.

Operation of the antenna system 20 involves an acquisition phase in which coarse information on the position of the object 110 with respect to the aircraft 22 is obtained and a tracking phase in which high resolution or fine information is obtained on the position of the object 110 relative to the aircraft 22. With respect to either the acquisition phase or the tracking phase, the electromagnetic signal received by the antenna array 34 can be the electromagnetic signal reflected by the object 110 but originally produced by the forward looking array 26 or the side looking array 44 using, respectively, either the forward transmit circuitry 174a or the side looking transmit circuitry 174b. This would occur if, for example, the antenna system 20 is part of an active radar or similar system. Alternatively, the electromagnetic signal received by the antenna array can be the electromagnetic signal reflected by the object 110 but originally produced by another transmission source as in a semi-active radar or like device. Additionally, the electromagnetic signal received by the antenna array 34 can be the signal transmitted by the object 110. This would be the situation if, for example, the antenna system 20 is part of a passive radar or comparable device. With respect to the acquisition phase, the elevation angle $\theta$ of the object 110 is determined by using the forward looking receive array 40 to scan the angles between ±20° from the roll axis 112 and using at least one of the first side looking receive array 48 and the second side looking receive array 50 to scan between ±20°–60° relative to the roll axis 112.

When the forward looking receive array 40 is being used in the acquisition phase to scan at a particular elevational angle $\theta$ with respect to the roll axis 112, the multi-beam beamformer 74 is used to generate a single beam from the signals produced by up to eight of the forward looking elements 42 of the forward looking receive array 40 upon reception of an electromagnetic signal. Consequently, up to eight of the first switches 98a or eight of the second switches 98b are place in an "ON" state by the processor 100 so that either the first power combiner 102a or the second power combiner 102b can produce a beam. All other switches comprising the switch array 96 are place in an "OFF" state. The single beam produced by either the first power combiner 102a or the second power combiner 102b is applied to the dual-channel receiver 104 which measures the amplitude of the beam. The forward looking receive array 40 is then used to scan a different elevational angle $\theta$ with respect to the roll axis 112 and the multi-beam beamformer 74 is used to generate another beam whose amplitude is measured by the dual-channel receiver 104. After the forward looking receive array 40 is used to scan between 0° and 20° relative to the roll axis 112, either the first side looking receive array 48 or the second side looking receive array 50 is used to scan the elevational angles between 20° and 60° relative to the roll axis 112 in substantially the same manner as described with respect to the forward looking receive array 40. By comparing the amplitudes at the various scan angles between 0° and 60° relative to the roll axis 112, the elevational angle $\theta$ at which the maximum amplitude beam was produced can be identified, thereby determining the coarse or rough elevational angle $\theta$ of the object 110 with respect to the aircraft 22.

As an alternative to sequential lobing, i.e., determining the elevational angle $\theta$ of the object 110 by making sequential amplitude measurements and comparing the measurements to determine the elevational angle $\theta$ at which the maximum amplitude occurs, the multi-beam beamformer 74 can be used to generate two beams at substantially the same time and then the dual-channel receiver 104 can be used to compare the amplitudes of the two beams to implement a simultaneous lobing scheme. As with the prior method for determining the angle $\theta$, up to eight of the antenna elements can be used to generate either or both of the two beams.

In the acquisition phase, the roll plane angle $\phi$ of the object 110 is determined by scanning $\phi$ between 0° and 360° using the forward looking receive array to determine $\phi$ for objects that are located in the field of view of the forward looking receive array 40. More specifically, the multi-beam beamformer 74 is used to generate a single beam from the signals produced by up to eight of the forward looking elements 42. The single beam is then provided to the dual-channel receiver 104, which measures the amplitude of the beam. The multi-beam beamformer 74 is then used to generate a second beam from the signals produced by a second subset of the forward looking elements 42 that covers a different circumferential area than the first subset of forward looking elements 42 that were used to generate the first beam. The second beam is then applied to the dual-channel receiver 104, which measures the amplitude of the second beam. This process is repeated until the angle φ of the subset of forward looking elements 42 that produces the maximum amplitude beam can be determined. Similarly, the roll plane angle φ is determined when the object 110 is in the field of view of the side looking array 44 by scanning φ from 0° to 360° using the first side looking receive array and the second side looking receive array 50. More specifically, several column arrays 54 of the first and second side looking receive arrays 48, 50 are used to generate a first beam at a first angle φ. The switch array 96 of the multi-beam beamformer 74 is then used to define a second subset of column arrays 54 of the first and second side looking receive arrays 48 and 50 to form a second beam at a different angle φ. The second beam, like the first beam, is provided to the dual-channel receiver 104, which makes an amplitude measurement of the second beam. This process is repeated until φ has been scanned through the entire 360° area. The amplitudes of the various beams formed during the scan can then be compared to one another to identify the beam with the maximum amplitude and hence the coarse angle φ of the object 110. As an alternative to the use of sequential lobing to determine the roll plane angle φ, simultaneous lobing can also be used.

In the tracking phase, the antenna system 20 is used as a wide baseline interferometer to obtain fine or high resolution information on the position of an object relative to the aircraft 22. More specifically, the antenna system 20 is used to generate two spatially independent, overlapping beams whose phase relationship is compared to realize high resolution data on the position of an object relative to the aircraft 22. The antenna system 20 permits the baseline or aperture of the antenna array 34 to be altered so that ambiguities in the data relating to the position of an object can be resolved. Further, the antenna system 20 permits the beamwidth of the two beams produced by the antenna system to be altered so that a focused or high gain beam can be produced in the direction of the object.

As with the acquisition phase, the tracking phase can be divided into a forward tracking phase in which the forward looking array 35 is utilized and a side tracking phase in the side looking array 44 is employed. In the forward tracking phase, a first subset of the forward looking elements 42 of the forward looking receive array 40 and a second subset of the forward looking elements 42 of the forward looking receive array 40 that is diametrically opposed to the first subset are used by the beamformer 74 to substantially simultaneously generate the two beams that are phase compared to realize an interferometer that provides high resolution data on the position of the object 110.

With the foregoing background in mind, the various geometrical relationships between the roll axis 112, the roll plane 114 in which the forward looking receive array 40 is located, and an object 110 are defined with reference to FIGS. 7A and 7B. As before, the elevational angle θ is the angle of the object 110 relative to the roll axis 112. The roll angle φ is the angle of the object 110 in the roll plane 114 relative to a plane defined by the roll axis 112 and a lateral axis that extends between the midpoints of the two subsets of the forward looking receive array 40. The lateral axis will hereinafter be referred to as the antenna axis 122. Further, the two subsets used to form the two beams are identified in FIG. 7B as the first antenna subset 124a and the second antenna 124b. When the roll angle φ of the object 110 equals 0°, the object 110 lies in the plane defined by the antenna axis and the roll axis. This particular plane will be referred to as the in-plane. When the roll angle φ of the object 110 equals 90°, the plane defined by the object and the roll axis 112 is orthogonal to the plane defined by the antenna axis 122 and the roll axis 112. This plane will be referred to hereinafter as the cross-plane.

With the foregoing definitions in mind, the phase difference between a signal produced by the object 110 that is received by the first antenna subset 124a and the second antenna subset 124b is defined by the following equation:

$$\Delta = d(\sin\theta)(\cos\phi)2\pi/\lambda \qquad (1)$$

where Δ is the phase difference, d is the distance between the first antenna subset 124a and the second antenna subset 124b, θ is the elevational angle of the object, φ is the roll angle of the object, and λ is the wavelength of the received signal. From equation (1), a phase difference of zero will be achieved when the object 110 is in the cross-plane because the cosine of 90° is zero. The cross-plane also defines the point at which the maximum error slope for the roll plane measurement φ occurs, i.e., the point at which the change in phase Δ with respect to the roll angle φ is greatest and therefore maximum resolution is obtained. Conversely, the in-plane defines the point at which the maximum error slope for the elevational angle θ occurs, i.e., the point at which the change in phase Δ with respect to elevational angle θ is greatest. However, it has been found that the error slope at 70° off the in-plane or 20° from the cross-plane is still quite high and provides sufficiently high resolution in many instances.

Figure 8:
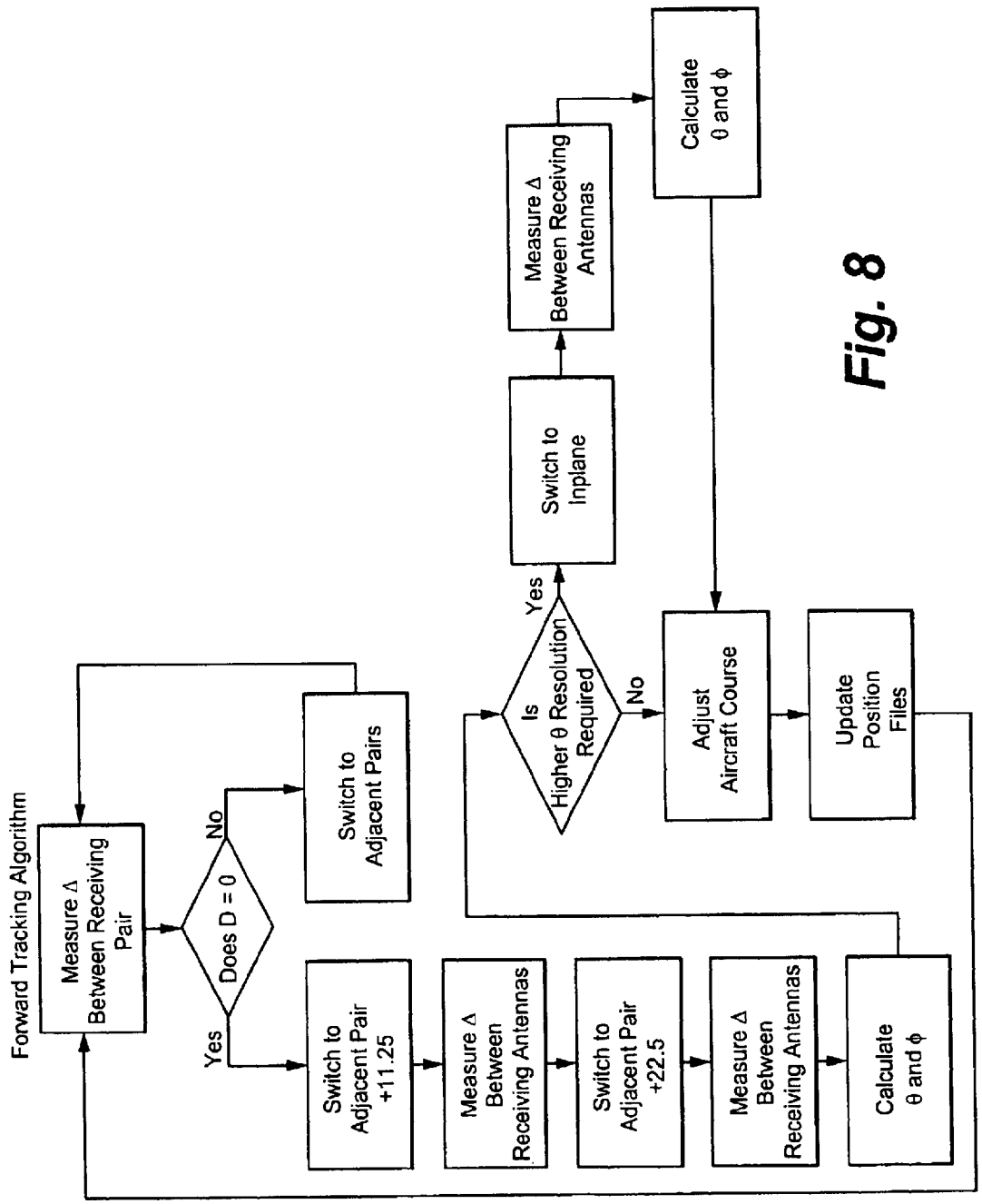
FIG. 8 is a flow chart that illustrates the process used to determine fine resolution data when the forward looking receive array is in use.

Consequently, the elevational angle θ and the roll plane angle φ of an object relative to the aircraft 22 can be determined by measuring the phase difference Δ between pairs of beams that are substantially simultaneously produced by the multi-beam beamformer 74 from different subsets of the forward looking elements 42 of the forward looking receive array 40 located between ±20° with respect to the cross-plane. More specifically, and with reference to FIG. 8, forward looking tracking is commenced by the processor 100 selecting which of the forward looking elements 42 or which of the signals produced by the forward looking elements are to be used to generate the two spatially independent, overlapping beams whose phase is later compared by the dual-channel receiver 104. As previously mentioned, the selected forward looking elements 42 are located on opposite sides of the roll axis 112 with respect to one another.

Once the first subset 124a and the second 124b of the forward looking elements 42 of the forward looking receive array 40 have been selected, the beamformer 74 operates to substantially simultaneously produce a first beam and a spatially independent but overlapping second beam that are applied to the dual-channel receiver 104. The dual-channel receiver 104 then measures the phase difference between the first and second beams. If the phase difference Δ is not zero, then the cross-plane has not been located and the processor 100 uses the switch array 96 to select a new first subset 124a and a new second subset 124b of the forward looking elements 42 of the forward looking receive array 40 for generating the first and second beams. This process is repeated until the cross-plane is located.

Once the cross-plane is located, the processor 100 causes the switch array 96 to select the signals produced by the two forward looking elements 42 that are adjacent to the two forward looking elements that were used to identify the cross-plane to produce two new spatially independent but overlapping beams. In effect, the switch array has been used to electronically roll the two beams about the roll axis 112 or, stated differently, change the aperture of the antenna elements used to generate the two beams. The phase difference Δ between this new pair of beams is then measured by the dual-channel receiver 104 and stored. The processor 100 then uses the switch array 96 to select the next two adjacent forward looking elements 42 for generating two new spatially independent, overlapping beams. These two beams will be approximately 22.5° off the cross-plane, which is further than necessary to obtain sufficient resolution of the elevational angle θ. The phase difference between the two new spatially independent, overlapping beams is measured by the dual-channel receiver 104 and stored. The dual-channel receiver 104 can then use the three phase measurements, the one at the cross-plane, the one at the first adjacent pair, and the one at the second adjacent pair, to determine the elevational angle θ and the roll plane angle φ of the object 110 relative to the aircraft 22.

If higher resolution of the elevational angle measurement is needed, the processor 100 can use the switch array 96 to select first and second subsets 124a, 124b of the forward looking elements 42 in the forward looking receive array 40 that are in the in-plane, which is the location at which the maximum error slope and resolution for θ exists.

After the elevational angle θ and the roll plane angle φ have been determined, the position of the aircraft 22 can be corrected and the positional relationship between the aircraft 22 and the object 110 updated. The process of then locating the cross-plane, measuring the phase difference by dithering the selected forward looking elements 42 about the cross-plane, using the different phase measurements to determine the elevational angle θ and roll plane angle φ, and, if necessary, determining the elevational angle θ to a greater degree by performing an in-plane measurement, is then repeated.

Figures 9A, 9B:
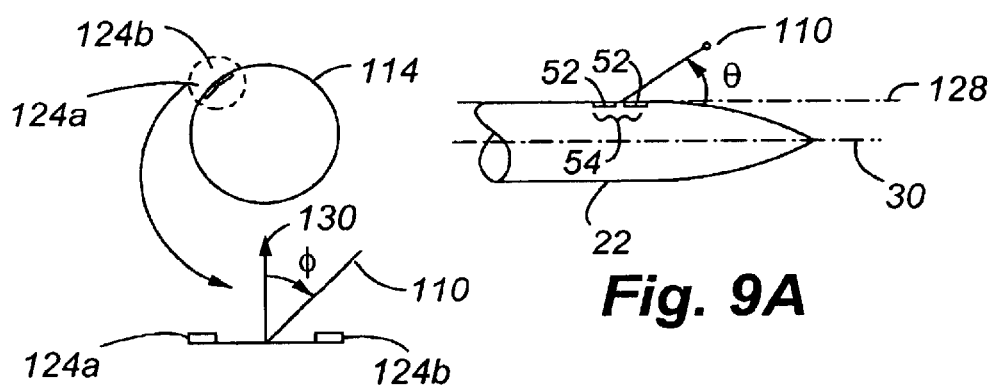
FIGS. 9A and 9B illustrate the geometrical or positional relationship between the aircraft shown in FIG. 1 and an object in the space surrounding the aircraft when the side looking receive array is being used to obtain fine resolution data.

When the first and second side looking receive arrays 48, 50 are used in the tracking phase, the antenna system 20 operates to generate two spatially independent and overlapping beams from the receive array whose phase can be compared to implement an interferometer that provides high resolution information on the position of an object relative to the aircraft 22. Before describing the side looking tracking phase, the geometric relationships between the aircraft 22, the first and second side looking receive arrays 48, 50, and/or column arrays 52, and the object 110 are described because they are somewhat different than those associated with the forward looking tracking. Specifically, and with reference to FIGS. 9A and 9B, the elevational angle θ of an object 110 is the angle relative to a column axis 128 of a column array 54 measured relative to the midpoint between the two side looking elements 52 comprising the column array 54. The roll plane angle φ is the angle between the object and an axis that is perpendicular to the midpoint of a line extending between the two subsets of the side looking receive array that is used to measure φ.

The phase relationship with respect to the roll plane angle φ between a signal that is received by the first subset 124a and the second subset 124b is defined by the following:

$$\Delta = d(\sin \phi) 2\pi / \lambda \qquad (2)$$

where Δ is the phase difference, d is the distance between the midpoints of the first and second subsets 124a, 124b, φ is the roll plane angle, and λ is the wavelength of the signal.

The phase relationship with respect to the elevational angle θ between the signals received by the two side looking elements comprising the column array 54 is defined by the following:

$$\Delta = d(\cos \theta) 2\pi / \lambda \qquad (3)$$

where Δ is the phase difference, d is the distance between the two elements comprising the column array 54, θ is the elevational angle, and λ is the wavelength of the signal received by the two side looking elements of the column array 54.

With respect to equations (1), (2), and (3), it should also be appreciated that by increasing the frequency of the signal, which decreases the wavelength λ, the phase difference Δ can be increased. The phase difference λ can also be increased by increasing the distance d between the antenna elements. Consequently, by increasing the frequency of the signal or the distance between the elements, phase resolution can be improved.

Figure 10:
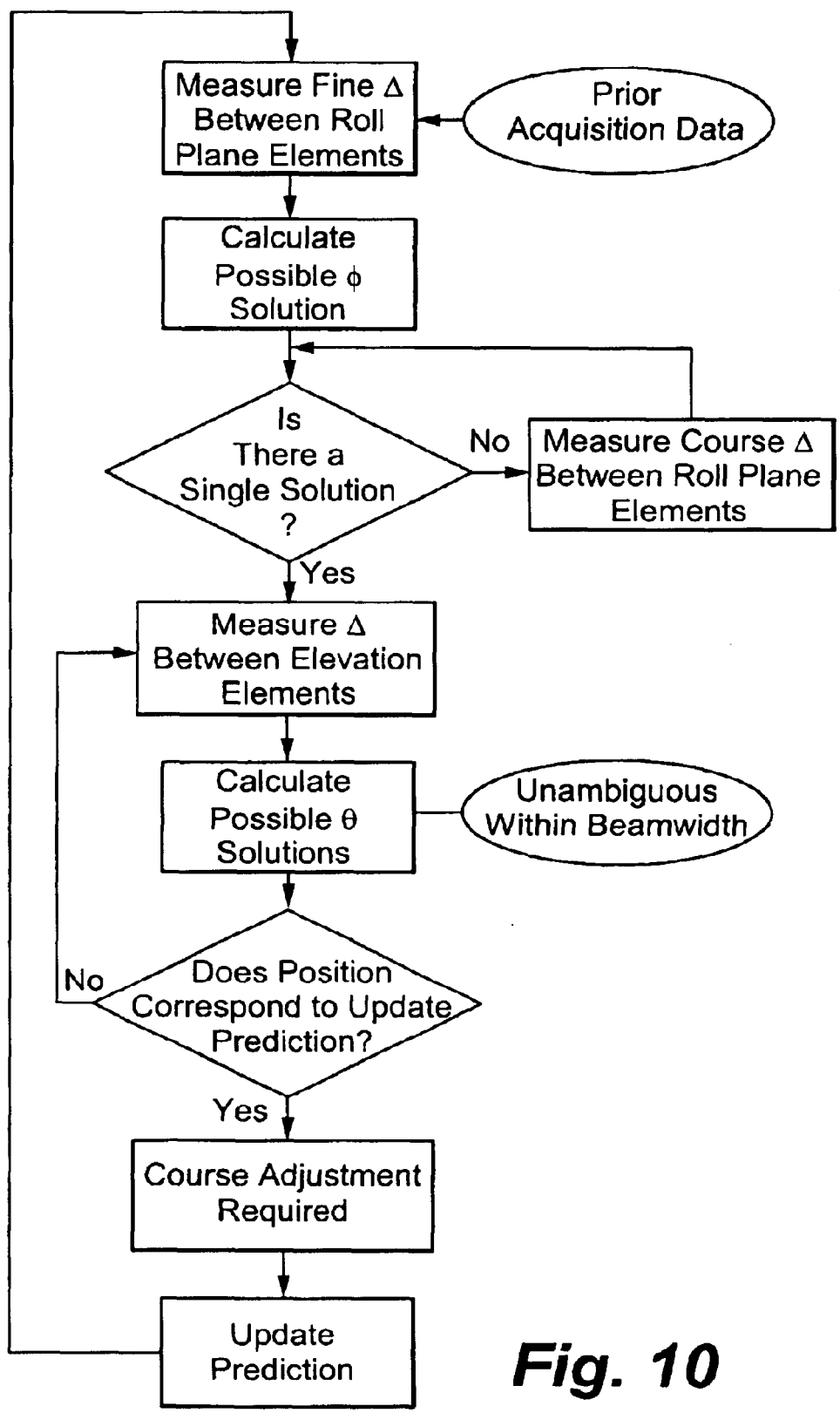
FIG. 10 is a flow chart that shows the process used to determine fine resolution data when the side looking receive array is in use.

Based upon equations (2) and (3) and with reference to FIG. 10, the antenna system 20 commences the determination of the roll plane angle φ of the object 110 by using the processor 100 to select the first and second subsets 124a and 124b of the side looking antenna elements 52 of either the first side looking receive array 48 or the second side looking receive array 50 that are to be used to form two spatially independent but overlapping beams. Once the first and second subsets 124a, 124b have been selected, the multi-beam beamformer 74 then forms the two spatially independent, overlapping beams and provides the two beams to the dual-channel receiver 104. The dual-channel receiver 104, in response, determines the phase difference Δ between the two signals and then uses equation (2) to calculate the roll plane angle φ. There is a possibility that there may be more than two possible roll plane angles that satisfy equation (2). If this is the case, then the processor 100 changes the baseline between the first and second subsets 124a, 124b by selecting new first and second subsets 124a, 124b for use in forming the two beams. After the new first and second subsets 124a, 124b have been selected, the multi-beam beamformer 74 again forms the two spatially independent, overlapping beams and provides them to the dual-channel receiver 104. The dual-channel receiver 104 again determines the phase difference Δ between the two beams and calculates the roll plane angle φ. The second calculation of the roll plane angle φ provides sufficient information to determine which of the two initially calculated phase plane angles φ is the correct angle.

After the roll plane angle φ has been determined, determination of the elevational angle θ by the antenna system 20 commences with the processor 100 selecting at least one side looking element 52 of the side looking receive array 48 and the signal produced by at least one side looking element 52 of the second side looking receive array 50 for use in forming the two spatially independent, overlapping beams. After the selection, the multi-beam beamformer 74 generates the two spatially independent, overlapping beams from the selected signals and provides the two beams to the dual-channel receiver 104. The dual-channel receiver 104 then measures the phase difference Δ between the two beams and then determines the two possible solutions for the elevational angle θ. If both of the possible solutions for the elevational angle θ are outside a predicted value for the elevational angle θ determined during the acquisition phase, then the measurement of the phase difference θ is repeated. This process continues until at least one of the possible elevational angles θ is within the predicted range. Once the elevational angle θ is resolved, the course of the aircraft 22 is adjusted, if required, and the locational information on the object 110 is updated. The process illustrated in FIG. 10 is then repeated.

Figure 11:
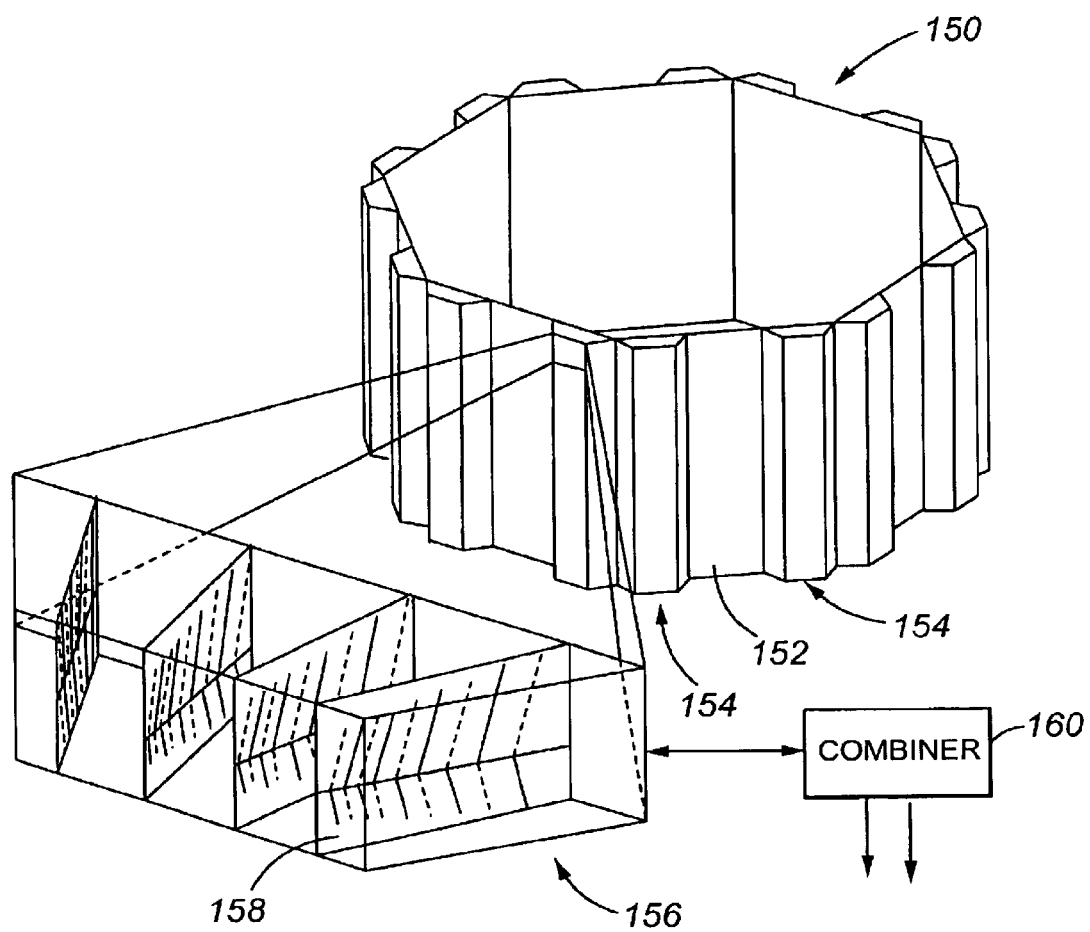
FIG. 11 illustrates a second embodiment of the antenna system of the present invention in which the antenna system forms part of a transponder system in which the antenna system is useful in reducing the possibility of signals being transmitted or received by the antenna from being intercepted and includes a plurality of facets, a plurality of asymmetric log period dipole elements that are arranged into subarrays that are, in turn, arranged into column arrays, with two column arrays located on each facet.
Figure 12:
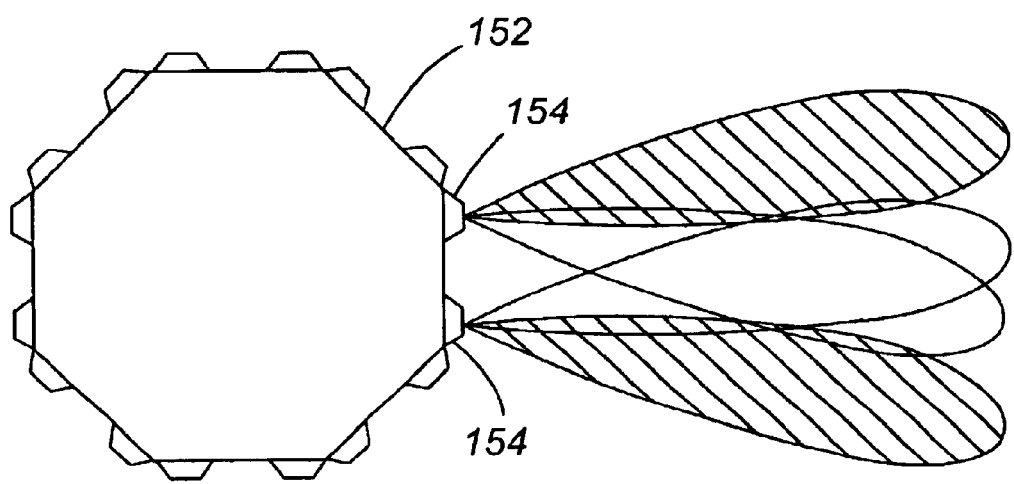
FIG. 12 illustrates the two beam directions associated with each of the column arrays on a single facet.

With reference to FIG. 11, a second embodiment of the antenna system 20 is illustrated. This embodiment of the antenna system 20 is useful in reducing the possibility of the signals that are being transmitted or received by the antenna system being intercepted and is also capable of being used in low SNR environments. The antenna system 20 includes a surface 150 that is comprised of eight facets 152 that each support a portion of the antenna array. More specifically, each facet 152 supports two column arrays 154 that are separated from one another. Each of the column arrays 154 is comprised of a plurality of vertically juxtaposed subarrays 156. Each subarray 156 is, in turn, comprised of four horizontally juxtaposed antenna elements 158. The antenna element 158 is a nine dipole asymmetric log periodic antenna element. The spacing between the antenna elements 158 comprising the subarray 156 is tapered in depth so that a frequency-independent azimuth beamwidth is realized across the frequency bandwidth of the antenna system 20. Further, each of the subarrays 156 provides the signal it produces to a combiner 160 that produces two symmetrical beams at ±11.25° relative to the boresite of the subarray 156 as illustrated in FIG. 12 for the subarrays 156 associated with one of the facets 152.

Figure 13:
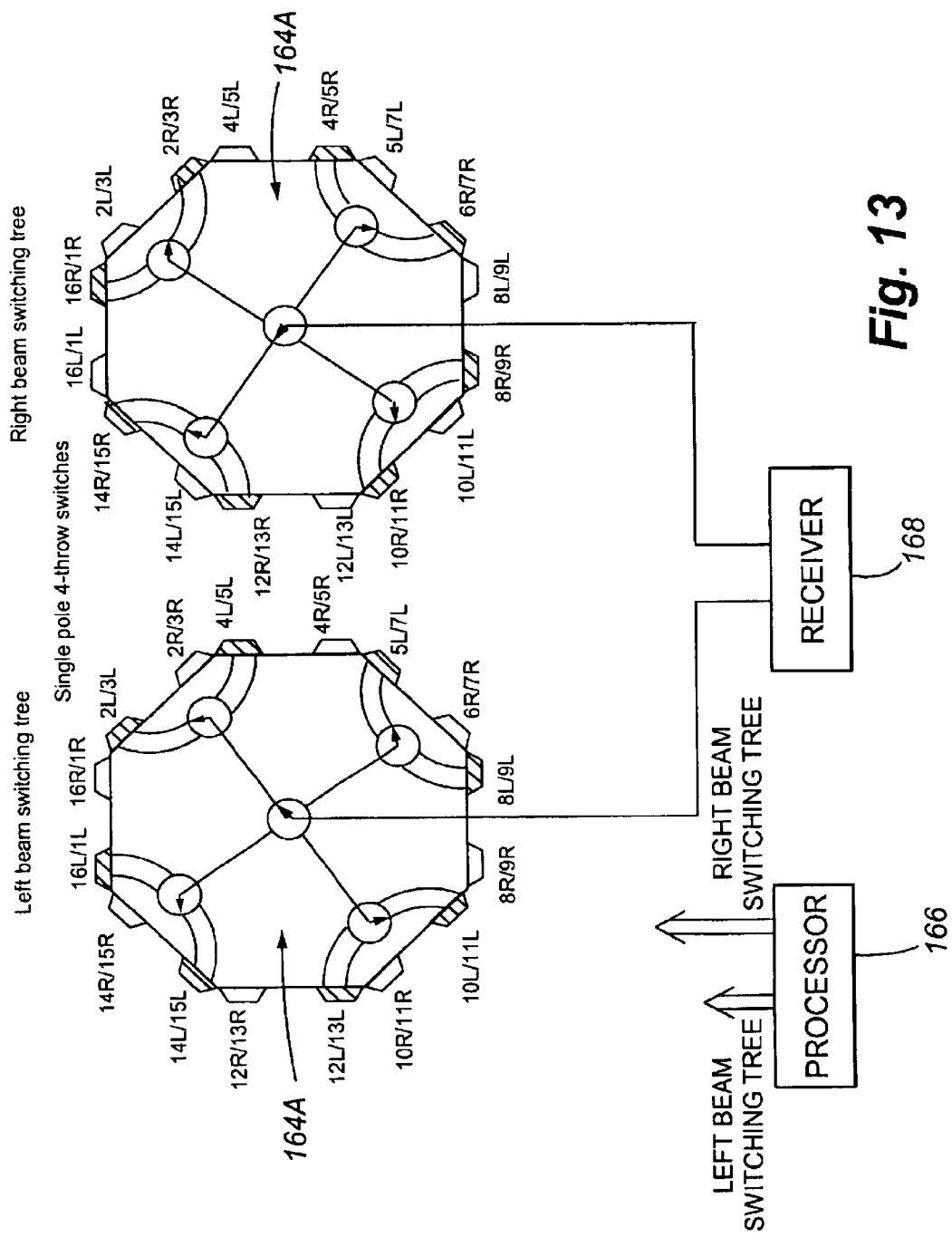
FIG. 13 illustrates the two independent switching networks used to control the antenna array.

The antenna system 20 also includes a switching network that is illustrated in FIG. 13. The switching network includes a left beam switching tree 164a that is associated with the left column array 154 of each facet 152 and a right beam switching tree 164b that is associated with the right column array 154 of each facet. Both the left beam switching tree 164a and the right beam switching tree 164b include a plurality of switches whose state, either "ON" or "OFF", is controlled by a processor 166. The processor 166 controls the switches of the left beam switching tree 164a and the right beam switching tree 164b such that one of the two beams produced by the column array 154 of one of the facets 152 that is associated with the left beam switching tree 164a and one of the two beams produced by one of the column arrays 154 of one of the facets 152 that is associated with the right beam switching tree 164b is provided to a dual-channel receiver 168. The dual-channel receiver 168 performs amplitude and phase comparisons of the two beams provided by the two switching trees that can be used to determine information on the location of an object relative to the antenna system 20.

FIG. 14 shows the switching matrix implemented by the processor 166 for accomplishing course or amplitude comparisons of the two beams provided by the switching network and the fine or phase comparison of the two beams provided by the switching network. As the switching matrix shown in FIG. 14 illustrates, there are thirty-two possible switching states; sixteen are associated with coarse or amplitude comparison, and the other sixteen are associated with fine or phase comparison.

Operation of the antenna system 20 has an acquisition phase and a tracking phase just as with the prior embodiment. As with the other embodiment, the electromagnetic signal received by the antenna can be the signal reflected by an object but originally produced by the antenna system 20 or other transmission device, or an electromagnetic signal produced by the object itself. In the acquisition phase, the processor 166 controls the switching network so that the 360° azimuth plane about the antenna system 20 is scanned and coarse or amplitude comparisons of the two spatially independent but overlapping beams defined by the table in FIG. 14 can be made. More specifically, in the acquisition phase, the processor 166 sequentially places the switching networks in the odd numbered states set forth in FIG. 14. In each state, the left beam switching tree 164a provides a first beam to the dual-channel receiver 168 and the right beam switching tree 164b provides a second beam that is spatially independent but overlapping with the first beam to the dual-channel receiver 168. The dual-channel receiver 168 performs an amplitude comparison of the two beams and stores the result of the comparison. The comparison information is then used to identify the locations of objects relative to the antenna system 20.

In the tracking phase, the processor 166 places the switching network in the even numbered states identified in FIG. 14. In each state, the left beam switching tree 164a provides a first beam to the dual-channel receiver 168 and the right beam switching tree 164b provides a second beam to the dual-channel receiver 168 that is spatially independent but overlapping with respect to the first beam to the dual-channel receiver 168. In response, the dual-channel receiver 168 performs a phase comparison of the two beams to generate fine or high resolution data on the position of an object relative to the antenna system. This process is then repeated, if necessary, for the other even numbered states defined in FIG. 14 and the comparison information generated is then used to provide high resolution information on the location of objects relative to the antenna system 20.

Once an object is located, the antenna system can be used to communicated with the object, such as an aircraft. Further, due to the highly directional or focused character of the beams, high gain of the beams, and/or low side lobes of the beams, the possibility of communications between the antenna system 20 and the object being intercepted are substantially reduced and communications can be conducted in a low SNR environment.

Figure 15:
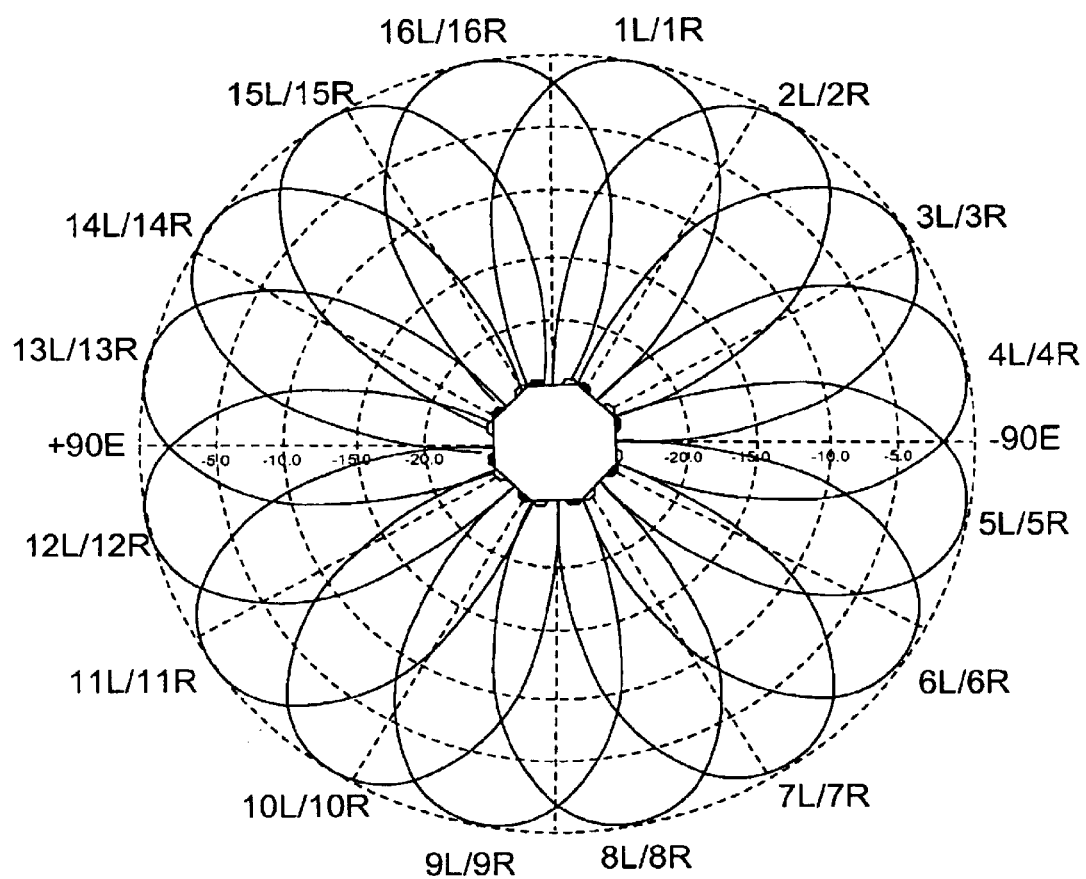
FIG. 15 illustrates all thirty-two beams that can be produced by the antenna system illustrated in FIG. 11.

FIG. 15 shows the 360° azimuth coverage provided by all thirty-two beams that can be produced by the antenna system 20 over time. Because the antenna system 20 produces pairs of overlapping beams, there appears to be only sixteen beams.

The foregoing description of the invention has been presented for purposes of illustration and description. Further, the description is not intended to limit the invention to the form disclosed herein. Consequently, variations and modifications commensurate with the above teachings, and the skill or knowledge in the relevant art are within the scope of the present invention. For example, the antenna system of the present invention could be adapted to simultaneously produce three or more spatially independent and overlapping beams to reduce the switching time necessary to resolve ambiguities. The preferred embodiments described herein above is further intended to explain the best mode known of practicing the invention and to enable others skilled in the art to utilize the invention in various embodiments and with various modifications required by their particular applications or uses of the invention. It is intended that the appended claims be construed to include alternate embodiments to the extent permitted by the prior art.

What is claimed is:

1. An electronically agile antenna system comprising:

a body having an exterior surface;

an antenna array that is operatively connected to said body, has a plurality of elements, and is capable of providing a plurality of signals that are representative of the environment about the antenna system, each of said plurality of elements being capable of providing one of said plurality of signals;

a beamformer for processing a first portion of said plurality of signals provided by said antenna array to form a first beam and for processing a second portion of said plurality of signals provided by said antenna array to form a second beam, wherein said second beam is spatially independent but overlapping with said first beam; and means for cooperatively using said first beam and said second beam to determine information relating to the environment about the antenna system;

wherein said beamformer includes means for selecting which of said plurality of signals are used to form said first beam and which of said plurality of signals are used to form said second beam.

2. An electronically agile antenna system, as claimed in claim 1, wherein:

said plurality of elements of said antenna array includes more than two elements that are all located along a substantially circular arc.

3. An electronically agile antenna system comprising:

a body having an exterior surface;

an antenna array that is operatively connected to said body, has a plurality of elements, and is capable of providing a plurality of signals that are representative of the environment about the antenna system, each of said plurality of elements being capable of providing one of said plurality of signals;

a beamformer for processing a first portion of said plurality of signals provided by said antenna array to form a first beam and for processing a second portion of said plurality of signals provided by said antenna array to form a second beam; and means for cooperatively using said first beam and said second beam to determine information relating to the environment about the antenna system;

wherein said beamformer includes means for selecting which of said plurality of signals are used to form said first beam and which of said plurality of signals are used to form said second beam;

wherein said means for selecting includes means for changing the identity over time of which of said plurality of signals are used to form at least one of the following: said first beam and said second beam.

4. An electronically agile antenna system comprising:

a body having an exterior surface;

an antenna array that is operatively connected to said body, has a plurality of elements, and is capable of providing a plurality of signals that are representative of the environment about the antenna system, each of said plurality of elements being capable of providing one of said plurality of signals;

a beamformer for processing a first portion of said plurality of signals provided by said antenna array to form a first beam and for processing a second portion of said plurality of signals provided by said antenna array to form a second beam; and means for cooperatively using said first beam and said second beam to determine information relating to the environment about the antenna system;

wherein said beamformer includes means for selecting which of said plurality of signals are used to form said first beam and which of said plurality of signals are used to form said second beam;

wherein said beamformer forms said first beam at substantially the same time as said second beam;

wherein said means for selecting includes means for changing the identity over time of which of said plurality of signals are used to form said first beam and which of said plurality of signals are used to form said second beam to vary the baseline between said first beam and said second beam.

5. An electronically agile antenna system comprising:

a body having an exterior surface;

an antenna array that is operatively connected to said body, has a plurality of elements, and is capable of providing a plurality of signals that are representative of the environment about the antenna system, each of said plurality of elements being capable of providing one of said plurality of signals;

a beamformer for processing a first portion of said plurality of signals provided by said antenna array to form a first beam and for processing a second portion of said plurality of signals provided by said antenna array to form a second beam; and means for cooperatively using said first beam and said second beam to determine information relating to the environment about the antenna system;

wherein said beamformer includes means for selecting which of said plurality of signals are used to form said first beam and which of said plurality of signals are used to form said second beam;

wherein said means for selecting includes means for changing over time the number of said plurality of signals that are used to form at least one of the following: said first beam and said second beam.

6. An electronically agile antenna system comprising:

a body having an exterior surface;

an antenna array that is operatively connected to said body, has a plurality of elements, and is capable of providing a plurality of signals that are representative of the environment about the antenna system, each of said plurality of elements being capable of providing one of said plurality of signals;

a beamformer for processing a first portion of said plurality of signals provided by said antenna array to form a first beam and for processing a second portion of said plurality of signals provided by said antenna array to form a second beam; and means for cooperatively using said first beam and said second beam to determine information relating to the environment about the antenna system;

wherein said beamformer includes means for selecting which of said plurality of signals are used to form said first beam and which of said plurality of signals are used to form said second beam;

wherein said beamformer forms said first beam at substantially the same time as said second beam;

wherein said means for selecting includes means for changing over time the number of said plurality of signals that are used to form said first beam and the number of said plurality of signals that are used to form said second beam to change the beamwidth of said first beam and said second beam, respectively.

7. An electronically agile antenna system comprising:

a body having an exterior surface;

an antenna array that is operatively connected to said body, has a plurality of elements, and is capable of providing a plurality of signals that are representative of the environment about the antenna system, each of said plurality of elements being capable of providing one of said plurality of signals;

a beamformer for processing a first portion of said plurality of signals provided by said antenna array to form a first beam and for processing a second portion of said plurality of signals provided by said antenna array to form a second beam; and means for cooperatively using said first beam and said second beam to determine information relating to the environment about the antenna system;

wherein said beamformer includes means for selecting which of said plurality of signals are used to form said first beam and which of said plurality of signals are used to form said second beam;

wherein said means for cooperatively using includes means for performing an amplitude comparison of said first beam and said second beam.

8. An electronically agile antenna system comprising:

a body having an exterior surface;

an antenna array that is operatively connected to said body, has a plurality of elements, and is capable of providing a plurality of signals that are representative of the environment about the antenna system, each of said plurality of elements being capable of providing one of said plurality of signals;

a beamformer for processing a first portion of said plurality of signals provided by said antenna array to form a first beam and for processing a second portion of said plurality of signals provided by said antenna array to form a second beam; and means for cooperatively using said first beam and said second beam to determine information relating to the environment about the antenna system;

wherein said beamformer includes means for selecting which of said plurality of signals are used to form said first beam and which of said plurality of signals are used to form said second beam;

wherein said means for cooperatively using includes means for performing a phase comparison of said first beam and said second beam.

9. An electronically agile antenna system comprising:

a body having an exterior surface;

an antenna array that is operatively connected to said body, has a plurality of elements, and is capable of providing a plurality of signals that are representative of the environment about the antenna system, each of said plurality of elements being capable of providing one of said plurality of signals;

a beamformer for processing a first portion of said plurality of signals provided by said antenna array to form a first beam and for processing a second portion of said plurality of signals provided by said antenna array to form a second beam; and means for cooperatively using said first beam and said second beam to determine information relating to the environment about the antenna system;

wherein said beamformer includes means for selecting which of said plurality of signals are used to form said first beam and which of said plurality of signals are used to form said second beam;

wherein said means for cooperatively using includes means for performing an amplitude comparison and a phase comparison of said first beam and said second beam.

10. An electronically agile antenna system, as claimed in claim 1, wherein:

said beamformer includes a gallium arsenide field-effect transistor amplifier.

11. An electronically agile antenna system, as claimed in claim 1, wherein:

said means for selecting includes an absorptive gallium arsenide field-effect transistor switch.

12. An electronically agile antenna system, as claimed in claim 1, wherein:

said antenna array is substantially conformal to said exterior surface.

13. An electronically agile antenna system, as claimed in claim 1, wherein:

said exterior surface includes a front surface and a side surface; and all of said antenna array is located on said side surface.

14. An electronically agile antenna system, as claimed in claim 1, wherein:

said plurality of elements includes a transmit portion for transmitting a signal and a receive portion for receiving a signal.

15. An electronically agile antenna system, as claimed in claim 1, wherein:

said exterior surface includes a plurality of facets that are operatively connected to one another to form a closed, substantially tubular shaped surface, and a portion of said antenna array is located on each facet.

16. An electronically agile antenna system, as claimed in claim 1, wherein:

said exterior surface includes a plurality of facets that are operatively connected to one another to form a closed substantially tubular-shaped surface, each facet supporting a first portion of said antenna array and a second portion of said antenna array that is separated from said first portion of said antenna array.

17. An electronically agile antenna system, as claimed in claim 1, wherein:

said plurality of elements includes a log periodic element.

18. An electronically agile antenna system, as claimed in claim 1, wherein:

said antenna array includes a plurality of juxtaposed elements, each of said plurality of juxtaposed elements including a first end and a second end, wherein a first distance exists between corresponding of said first end of a pair of said plurality of juxtaposed elements and a second distance that is different than said first distance exists between corresponding of said second end of said pair of said plurality of juxtaposed elements.

19. An electronically agile antenna system comprising:

a body having an exterior surface;

an antenna array that is operatively connected to said body, has a plurality of elements, and is capable of providing a plurality of signals that are representative of the environment about the antenna system, each of said plurality of elements being capable of providing one of said plurality of signals;

a beamformer for processing a first portion of said plurality of signals provided by said antenna array to form a first beam and for processing a second portion of said plurality of signals provided by said antenna array to form a second beam; and means for cooperatively using said first beam and said second beam to determine information relating to the environment about the antenna system;

wherein said beamformer includes means for selecting which of said plurality of signals are used to form said first beam and which of said plurality of signals are used to form said second beam;

wherein said antenna array includes a first array of horizontally juxtaposed elements and a second array of horizontally juxtaposed elements, wherein said first array is vertically juxtaposed with respect to said second array.

20. An electronically agile antenna system comprising:

a body that is capable of moving, has a longitudinal axis, and has an exterior surface comprised of a side surface and a front surface;

an antenna array that is operatively connected to said body and has a low profile with respect to said exterior surface, has a plurality of elements, and is capable of providing a plurality of signals that are representative of the environment about the antenna system, each of said plurality of elements being capable of providing one of said plurality of signals;

a multi-beam beamformer for processing a first portion of said plurality of signals to form a first beam and a second portion of said plurality of signals to form a second beam; and means for using said first beam and said second beam to determine information relating to the environment about the antenna system, wherein said means for using includes means for performing at least one of the following: an amplitude comparison and a phase comparison of said first beam and said second beam.

21. An electronically agile antenna system, as claimed in claim 20, wherein:

said body is a missile.

22. An electronically agile antenna system, as claimed in claim 20, wherein:

said means for using includes means for cooperatively using said first beam and said second beam.

23. An electronically agile antenna system, as claimed in claim 20, wherein:

said antenna array is conformal to said exterior surface.

24. An electronically agile antenna system, as claimed in claim 20, wherein:

said multi-beam beamformer includes means for selecting which of said plurality of signals is used to form said first beam and which of said plurality of signals is used to form said second beam.

25. An electronically agile antenna system, as claimed in claim 20, wherein:

all of said antenna array is located on said side surface.

26. An electronically agile antenna system, as claimed in claim 20, wherein:

a first element of said plurality of elements is located on said side surface and in a lateral plane relative to said longitudinal axis; and a second element of said plurality of elements is located on said side surface and in said lateral plane.

27. An electronically agile antenna system, as claimed in claim 20, wherein:

a first element of said plurality of elements is located on said side surface and at a first distance along said longitudinal axis; and a second element of said plurality of elements is located on said side surface, substantially in line with said first element, and at a second distance along said longitudinal axis that is different than said first distance.

28. An electronically agile antenna system, as claimed in claim 27, wherein:

said first element is used to receive a signal and said second element is used to do one of the following: receive a signal and transmit a signal.

29. An electronically agile antenna system, as claimed in claim 20, wherein:

a first element of said plurality of elements is located on said side surface; and a second element of said plurality of elements is located on said side surface and opposite to said first element relative to said longitudinal axis.

30. An electronically agile antenna system, as claimed in claim 20, wherein:

a first pair of said plurality of elements with one element located opposite to the other element relative to said longitudinal axis, said first pair being capable of providing a first pair of signals of said plurality of signals;

a second pair of said plurality of elements with one element located opposite to the other element relative to said longitudinal axis, said second pair being capable or providing a second pair of signals of said plurality of signals; and said multi-beam beamformer includes means for selecting which of said first pair of signals and said second pair of signals is used to form said first beam and said second beam.

31. An electronically agile antenna system, as claimed in claim 20, wherein:

a first pair of said plurality of elements that is located on said side surface and in a lateral plane relative to said longitudinal axis and is capable of providing a first pair of signals of said plurality of signals;

a second pair of said plurality of elements that is located on said side surface and in said lateral plane and is capable or providing a second pair of signals of said plurality of signals; and said multi-beam beamformer includes means for selecting which of said first pair of signals and said second pair of signals is used to form said first beam and said second beam.

32. An electronically agile antenna system, as claimed in claim 20, wherein:

a first pair of said plurality of elements that is located on said side surface, substantially in line with one another, and with one of said first pair at a first distance along said longitudinal axis and the other at a second distance along said longitudinal axis that is different than said first distance, and is capable of providing a first pair of signals of said plurality of signals;

a second pair of said plurality of elements that is located on said side surface, substantially in line with one another, and with one of said second pair at said first distance along said longitudinal axis and the other at said second distance along said longitudinal axis, and is capable of providing a second pair of signals of said plurality of signals; and said multi-beam beamformer includes means for selecting which of said first pair of signals and said second pair of signals is used to form said first beam and said second beam.

33. An electronically agile antenna system, as claimed in claim 20, wherein:

a portion of said plurality of elements has an endfire pattern.

34. An electronically agile antenna system, as claimed in claim 20, wherein:

a first portion of said plurality of elements has a first pattern that covers a first field of view relative to said longitudinal axis; and a second portion of said plurality of elements has a second pattern that covers a second field of view relative to said longitudinal axis that substantially avoids overlapping with said first field of view.

35. An electronically agile antenna system, as claimed in claim 34, wherein:

said first pattern includes an endfire pattern.

36. An electronically agile antenna system, as claimed in claim 20, wherein:

a first portion of said plurality of elements is used to transmit a signal and a second portion of said plurality of elements is used to receive a signal.

37. An electronically agile antenna system, as claimed in claim 20, further including:

a sensor that is located at one of the following locations: in between said front surface and said antenna array, and in between said plurality of elements.

38. A method for providing an electronically agile antenna system comprising the steps of:

providing an antenna array that has a plurality of elements and is capable of providing a plurality of signals that are representative of the environment about the antenna system, each of said plurality of elements being capable of providing one of said plurality of signals;

using a first subset of said plurality of signals to form a first beam;

using a second subset of said plurality of signals that is different than said first subset to form a second beam, wherein said second beam is spatially independent but overlapping with said first beam;

cooperatively using said first beam and said second beam to determine information relating to the environment about the antenna system; and electronically changing said first subset and said second subset; and repeating said steps of using a first subset, using a second subset, and using said first beam and second beam.

39. A method for providing an electronically agile antenna system comprising the steps of:

providing an antenna array that has a plurality of elements and is capable of providing a plurality of signals that are representative of the environment about the antenna system, each of said plurality of elements being capable of providing one of said plurality of signals;

using a first subset of said plurality of signals to form a first beam;

using a second subset of said plurality of signals that is different than said first subset to form a second beam;

cooperatively using said first beam and said second beam to determine information relating to the environment about the antenna system; and electronically changing said first subset and said second subset; and repeating said steps of using a first subset, using a second subset, and using said first beam and second beam;

wherein said step of electronically changing includes electronically changing the number of signals in said first subset and said second subset.

40. A method for providing an electronically agile antenna system comprising the steps of:

providing an antenna array that has a plurality of elements and is capable of providing a plurality of signals that are representative of the environment about the antenna system, each of said plurality of elements being capable of providing one of said plurality of signals;

using a first subset of said plurality of signals to form a first beam;

using a second subset of said plurality of signals that is different than said first subset to form a second beam;

cooperatively using said first beam and said second beam to determine information relating to the environment about the antenna system; and electronically changing said first subset and said second subset; and repeating said steps of using a first subset, using a second subset, and using said first beam and second beam;

wherein said step of electronically changing includes electronically changing the identity of the signals in said first subset and said second subset.

41. A method for providing an electronically agile antenna system comprising the steps of:

providing an antenna array that has a plurality of elements and is capable of providing a plurality of signals that are representative of the environment about the antenna system, each of said plurality of elements being capable of providing one of said plurality of signals;

using a first subset of said plurality of signals to form a first beam;

using a second subset of said plurality of signals that is different than said first subset to form a second beam;

cooperatively using said first beam and said second beam to determine information relating to the environment about the antenna system; and electronically changing said first subset and said second subset; and repeating said steps of using a first subset, using a second subset, and using said first beam and second beam;

wherein said step of cooperatively using said first beam and said second beam includes performing an amplitude comparison of said first beam to said second beam.

42. A method for providing an electronically agile antenna system comprising the steps of:

providing an antenna array that has a plurality of elements and is capable of providing a plurality of signals that are representative of the environment about the antenna system, each of said plurality of elements being capable of providing one of said plurality of signals;

using a first subset of said plurality of signals to form a first beam;

using a second subset of said plurality of signals that is different than said first subset to form a second beam;

cooperatively using said first beam and said second beam to determine information relating to the environment about the antenna system; and electronically changing said first subset and said second subset; and repeating said steps of using a first subset, using a second subset, and using said first beam and second beam;

wherein said step of using a second subset of said plurality of signals to form a second beam occurs after said step of using a first subset of said plurality of signals to form a first beam.

43. A method for providing an electronically agile antenna system comprising the steps of:

providing an antenna array that has a plurality of elements and is capable of providing a plurality of signals that are representative of the environment about the antenna system, each of said plurality of elements being capable of providing one of said plurality of signals;

using a first subset of said plurality of signals to form a first beam;

using a second subset of said plurality of signals that is different than said first subset to form a second beam;

cooperatively using said first beam and said second beam to determine information relating to the environment about the antenna system; and electronically changing said first subset and said second subset; and repeating said steps of using a first subset, using a second subset, and using said first beam and second beam;

wherein said step of cooperatively using said first beam and said second beam includes performing a phase comparison of said first beam to said second beam.

44. A method for providing an electronically agile antenna system comprising the steps of:

providing an antenna array that has a plurality of elements and is capable of providing a plurality of signals that are representative of the environment about the antenna system, each of said plurality of elements being capable of providing one of said plurality of signals;

using a first subset of said plurality of signals to form a first beam;

using a second subset of said plurality of signals that is different than said first subset to form a second beam;

cooperatively using said first beam and said second beam to determine information relating to the environment about the antenna system; and electronically changing said first subset and said second subset; and repeating said steps of using a first subset, using a second subset, and using said first beam and second beam;

wherein said step of cooperatively using said first beam and said second beam includes performing an amplitude comparison of said first beam to said second beam followed by a phase comparison of said first beam to said second beam.

45. A method for providing an electronically agile antenna system comprising the steps of:

providing an antenna array that has a plurality of elements and is capable of providing a plurality of signals that are representative of the environment about the antenna system, each of said plurality of elements being capable of providing one of said plurality of signals;

using a first subset of said plurality of signals to form a first beam;

using a second subset of said plurality of signals that is different than said first subset to form a second beam;

cooperatively using said first beam and said second beam to determine information relating to the environment about the antenna system; and electronically changing said first subset and said second subset; and repeating said steps of using a first subset, using a second subset, and using said first beam and second beam;

wherein said step of electronically changing includes electronically changing the identity of the signals in the first subset and the second subset so that said first and second beams dither about a cross-plane.

46. An electronically agile antenna system, as claimed in claim 38, wherein:

said step of electronically changing said first subset and said second subset changes an aperture of said antenna array.

47. An electronically agile antenna system, as claimed in claims 1, 3, 4, 5, 6, 7, 8, 9 or 19, wherein:

least one element of said plurality of elements has an endfire pattern associated therewith.

48. An electronically agile antenna system, as claimed in claims 3, 4, 5, 6, 7, 8, 9 or 19, wherein:

said antenna array is substantially conformal to said exterior surface of said body.

49. An electronically agile antenna system, as claimed in claims 1, 3, 4, 5, 6, 7, 8, 9 or 19, wherein:

said first portion of said plurality of signals is a single signal provided by one of said plurality of elements of said antenna array.

50. An electronically agile antenna system, as claimed in claims 1, 3, 4, 5, 6, 7, 8, 9 or 19, wherein:

each of said plurality of elements of said array is used to receive at least a portion of an electromagnetic signal and provide one of said plurality of signals representative thereof.

51. An electronically agile antenna system, as claimed in claims 3, 4, 5, 6, 7, 8, 9 or 19, wherein:

said plurality of elements includes a first portion for transmitting an electromagnetic signal and a second portion for receiving an electromagnetic signal.

52. An electronically agile antenna system, as claimed in claims 1, 3, 4, 5, 6, 7, 8, 9 or 19, wherein:

said plurality of elements includes a first portion for transmitting an electromagnetic signal and a second portion that is different than said first portion for receiving an electromagnetic signal.

53. An electronically agile antenna system, as claimed in claim 20, wherein:

said first portion of said plurality of signals is a single signal provided by one of said plurality of elements of said antenna array.

54. An electronically agile antenna system, as claimed in claim 20, wherein:

each of said plurality of elements of said array is used to receive at least a portion of an electromagnetic signal and provide one of said plurality of signals representative thereof.

55. An electronically agile antenna system, as claimed in claim 20, wherein:

said plurality of elements includes a first portion for transmitting an electromagnetic signal and a second portion that is different than said first portion for receiving an electromagnetic signal.

56. An electronically agile antenna system, as claimed in claim 20, wherein:

said second beam is spatially independent but overlapping with said first beam.

57. A method as claimed in claims 38, 39, 40, 41, 42, 43, 44 or 45, wherein:

at least one element of said plurality of elements has an endfire pattern associated therewith.

58. A method as claimed in claims 38, 39, 40, 41, 42, 43, 44 or 45, wherein:

said antenna array is substantially conformal to said exterior surface of said body.

59. A method as claimed in claims 38, 39, 40, 41, 42, 43, 44 or 45, wherein:

said first portion of said plurality of signals is a single signal provided by one of said plurality of elements of said antenna array.

60. A method as claimed in claims 38, 39, 40, 41, 42, 43, 44 or 45, wherein:

each of said plurality of elements of said array is used to receive at least a portion of an electromagnetic signal and provide one of said plurality of signals representative thereof.

61. A method as claimed in claims 38, 39, 40, 41, 42, 43, 44 or 45, wherein:

said plurality of elements includes a first portion for transmitting an electromagnetic signal and a second portion for receiving an electromagnetic signal.

62. A method as claimed in claims 38, 39, 40, 41, 42, 43, 44 or 45, wherein:

said plurality of elements includes a first portion for transmitting an electromagnetic signal and a second portion that is different than said first portion and for receiving an electromagnetic signal.

* * * * *

UNITED STATES PATENT AND TRADEMARK OFFICE
CERTIFICATE OF CORRECTION

PATENT NO. : 6,768,456 B1
DATED : July 27, 2004
INVENTOR(S) : Lalezari et al.

It is certified that error appears in the above-identified patent and that said Letters Patent is hereby corrected as shown below:

<u>Title page,</u>
Item [*] Notice, delete "1,825" and insert -- 0 -- therefor

Signed and Sealed this

Twelfth Day of October, 2004

JON W. DUDAS
*Director of the United States Patent and Trademark Office*